US009280506B1

(12) United States Patent
Mohanty et al.

(10) Patent No.: US 9,280,506 B1
(45) Date of Patent: Mar. 8, 2016

(54) TRANSFER OF UNCOMPRESSED MULTIMEDIA CONTENTS OR DATA COMMUNICATIONS

(71) Applicant: Analogix Semiconductor, Inc., Santa Clara, CA (US)

(72) Inventors: Soumendra Mohanty, San Jose, CA (US); Ning Zhu, San Jose, CA (US)

(73) Assignee: Analogix Semiconductor, Inc., Santa Clara, CA (US)

( * ) Notice: Subject to any disclaimer, the term of this patent is extended or adjusted under 35 U.S.C. 154(b) by 0 days.

(21) Appl. No.: 14/456,941

(22) Filed: Aug. 11, 2014

Related U.S. Application Data

(63) Continuation of application No. 13/365,624, filed on Feb. 3, 2012, now Pat. No. 8,806,094, which is a continuation-in-part of application No. 12/889,796, filed on Sep. 24, 2010, now Pat. No. 8,151,018.

(60) Provisional application No. 61/246,060, filed on Sep. 25, 2009.

(51) Int. Cl.
*G06F 13/38* (2006.01)
*G06F 13/12* (2006.01)

(52) U.S. Cl.
CPC .............. *G06F 13/385* (2013.01); *G06F 13/12* (2013.01); *G06F 2213/0042* (2013.01)

(58) Field of Classification Search
CPC ................................ G06F 13/385; G06F 13/12
See application file for complete search history.

(56) References Cited

U.S. PATENT DOCUMENTS

| 5,828,905 | A | * | 10/1998 | Rao ................................. 710/63 |
| 6,098,130 | A | | 8/2000 | Wang |
| 7,856,104 | B2 | | 12/2010 | Douillet |
| 7,856,520 | B2 | | 12/2010 | Ranade et al. |
| 7,956,618 | B2 | | 6/2011 | Lundquist et al. |
| 8,127,335 | B2 | | 2/2012 | Hill et al. |
| 8,151,018 | B2 | | 4/2012 | Mohanty et al. |
| 8,176,214 | B2 | | 5/2012 | Jones et al. |

(Continued)

FOREIGN PATENT DOCUMENTS

WO   WO2011038211   3/2011

OTHER PUBLICATIONS

Universal Serial Bus 3.0 Specification Rev 1.0 Nov. 12, 2008.*

(Continued)

*Primary Examiner* — Idriss N Alrobaye
*Assistant Examiner* — Ronald Modo
(74) *Attorney, Agent, or Firm* — Carr & Ferrell LLP

(57) ABSTRACT

A system and corresponding method for transferring data via an interface assembly is provided. The data is transferred between a USB port of a first device and a media port of a second device. Uncompressed high definition media data may be received from the USB port. The received uncompressed high definition media data may be supplied to a media connector in accordance with a first media standard, such that the supplied data can be transmitted in accordance with the first media standard via the media connector to the media port of the second device. The uncompressed high definition media data may include multimedia data and side-band communication data. A single signal may be encoded and decoded in accordance with a protocol that enables the single signal to communicate all side-band communications to and from the source device via a single pin of a USB connector.

15 Claims, 30 Drawing Sheets

(56) References Cited

U.S. PATENT DOCUMENTS

| | | |
|---|---|---|
| 8,246,359 B2 | 8/2012 | Sloey et al. |
| 8,307,401 B1 | 11/2012 | Lida |
| 8,341,678 B1 * | 12/2012 | Du Val .............................. 725/74 |
| 8,429,713 B2 | 4/2013 | Candelore et al. |
| 8,593,996 B2 | 11/2013 | Lee et al. |
| 8,799,537 B1 | 8/2014 | Zhu et al. |
| 8,806,094 B2 | 8/2014 | Mohanty et al. |
| 2003/0104836 A1 | 6/2003 | Shinohara |
| 2005/0015527 A1 * | 1/2005 | Tanner ............................ 710/68 |
| 2007/0206641 A1 | 9/2007 | Egan |
| 2008/0079462 A1 * | 4/2008 | Chiu et al. .................... 326/115 |
| 2008/0250294 A1 | 10/2008 | Ngo et al. |
| 2008/0263621 A1 | 10/2008 | Austerlitz et al. |
| 2008/0291994 A1 | 11/2008 | Lida et al. |
| 2009/0094387 A1 | 4/2009 | Bunger et al. |
| 2010/0104029 A1 | 4/2010 | Lee et al. |
| 2011/0087806 A1 | 4/2011 | Mohanty et al. |
| 2011/0243035 A1 | 10/2011 | Hall et al. |
| 2012/0079140 A1 | 3/2012 | Bar-Niv et al. |
| 2012/0159032 A1 | 6/2012 | Onuki |

OTHER PUBLICATIONS

VESA DisplayPort Specification Rev 1.1a Jan. 11, 2008.*
ICRON, USB over DisplayPort, retrieved from http://www.icron.com, pp. 1-2.
Softpedia, DisplayPort to Support USB 2.0 Traffic, Jan. 15, 2008, retrieved from http://news.softpedia.com/news/ DisplayPort-to-Support-USB-2-0-Traffic-76320.shtml.
International Search Report and Written Opinion of the International Searching Authority Dated Nov. 19, 2010, International Application No. PCT/US2010/050175.

* cited by examiner

| Detection state | Compatiblity |
|---|---|
| Ground | USB |
| floating | USB |
| 124k ohm | USB |
| 68k ohm | USB |
| 36.5k ohm | USB |
| 1k ohm to 10k ohm | HD uncompressed media data signal |

| Pre-charge 10us or more | SYNC Pattern | Command [3:0] | ADDR[19:0] | LEN[7:0] | Data Less than 16 bytes | Stop |

| Pre-charge 10us or more | SYNC Pattern | Command [3:0] | 4'h0 | Data Less than 16 bytes | Stop |

TRANSFER OF UNCOMPRESSED MULTIMEDIA CONTENTS OR DATA COMMUNICATIONS

CROSS-REFERENCE TO RELATED APPLICATIONS

The present application is a continuation of U.S. patent application Ser. No. 13/365,624 (now U.S. Pat. No. 8,806,094, issued Aug. 12, 2014), filed Feb. 3, 2012, which is a continuation-in-part of prior U.S. patent application Ser. No. 12/889,796 (now U.S. Pat. No. 8,151,018, issued Apr. 3, 2012), filed Sep. 24, 2010, which claims the benefit of U.S. Provisional Patent Application No. 61/246,060 filed Sep. 25, 2009. All three applications are herein incorporated by reference.

FIELD OF INVENTION

The present invention relates generally to data transfer and, more particularly, to transfer of uncompressed multimedia contents or data communications.

BACKGROUND

A Universal Serial Bus (USB) communication standard is a universal wired interface and protocol to enable electronic devices to exchange data. Various connectors are specified for information exchange in accordance with the standard. One or more dedicated USB ports, i.e., USB connectors, are typically employed in an electronic device. There are three basic types of connectors identified in various USB 2.0 Specifications: Standard, Mini-USB, and Micro-USB connectors. In USB 3.0 Specifications, two basic types of connectors are defined: Standard, and Micro-USB connectors. The USB port of a device is typically coupled to the USB port of another device via a cable. A USB transceiver may be employed in each device to send and receive USB protocol signals to and from the corresponding USB port. Additionally, the USB protocol defines the power and ground connectivity between the two devices.

A DisplayPort (DP) communication standard is an interface and link protocol for transferring high definition video/audio and data across computer systems and electronics devices. The Video Electronics Standards Association (VESA) has defined various standards versions, which are incorporated by reference herein, including 1.1, 1.1a and 1.2. The DisplayPort standard defines a multi-laned one-way serial interface for connecting a source device, such as a system that generates a media or multimedia signal, i.e., video and/or audio, with a sink device, such as a display that renders the signal in audio-visual manner. Additionally, the DisplayPort standard defines a two way serial communication side-band channel, along with the multi-laned serial interface, for device configurations on either side of the connected link to identify and set the correct transmission of the multimedia content. The DP communications standard is defined by VESA as royalty free.

The DP protocol is scalable in terms of usable bandwidth and has a higher bandwidth than the high definition multimedia interface (HDMI) standard. The DP protocol uses one to four pairs of communication lines (called lanes) depending on the bandwidth needed to transmit a single video/audio stream. In case the link does not need four lanes to transfer information, one or two lanes can also be used to transfer one stream of video/audio data depending on the bandwidth needed. The two-way serial communication side-band channel is responsible for setting up the lanes requirement and other communications on both sides.

A dedicated DP protocol connector may be employed in a device for multimedia content communication with an external device in accordance with the DP communication standard. Most electronic devices that support wired data communication employ one or more USB connectors, but do not include a DP protocol connector due to size or upgradability limitations. What is needed is a more efficient system for communicating with devices having different communication protocols.

SUMMARY OF THE INVENTION

Various embodiments provide a system and method for transferring data. The data may be transferred between a USB port of a first device and a media port of a second device that is compatible with a first media standard. Uncompressed high definition media data may be received at a USB connector from the USB port. The received uncompressed high definition media data may be caused to be supplied to a media connector in accordance with the first media standard, such that the supplied data can be transmitted in accordance with the first media standard via the media connector to the media port of the second device. The uncompressed high definition media data may include multimedia data and side-band communication data. A single signal is encoded and decoded in accordance with a protocol such that the side-band communication to and from the source device can be communicated via the single signal.

According to various embodiments, data is transferred between a USB port of a first device and a media port of a second device, the media port being compatible with a first media standard. Uncompressed high definition media data may be received from the USB port of the first device. The received uncompressed high definition media data may be caused to be supplied to a media connector in accordance with the first media standard, such that the supplied uncompressed high definition media data in accordance with the first media standard can be transmitted in accordance with the first media standard via the media connector to the media port of the second device.

In some embodiments, a system for transferring data may include a universal serial bus (USB) connector having a first plurality of pins and a media connector having a second plurality of pins. The system may also include an electrical cable and a circuit. The electrical cable is for coupling the USB connector to the media connector and includes a plurality of conductors. The circuit is coupled to at least some of the plurality of conductors of the electrical cable at points between ends of the first plurality of pins of the USB connector and ends of the second plurality of pins of the media connector. The circuit is operable to cause uncompressed high definition media data received at the USB connector from a first device to be supplied in accordance with a first media standard to the media connector, such that the supplied media data can be transmitted via the media connector to a second device.

DETAILED DESCRIPTION OF EXEMPLARY EMBODIMENTS

A system and corresponding method for transferring data is provided. Universal Serial Bus (USB) protocol data or uncompressed high definition media data may be selectively supplied to a USB port of a device based on an indication of a device type received by the device. The selected data can be transmitted via the USB port to an external interface. The uncompressed high definition media data may comprise at least one lane of media (or multimedia) data in accordance with a DisplayPort standard. The indication may be received at the USB port from an external interface and may be indicative of a USB mode or a media mode. In the USB mode, the USB protocol data is supplied to the USB port. In the media mode, high definition media data from the transmitter is supplied to the USB port. The device may be configured in the USB mode to receive USB protocol data via the USB port from the external interface. The external interface may be coupled to another device for transferring the USB protocol data or uncompressed high definition media data.

The uncompressed high definition media data may comprise at least one lane of media or multimedia data in accordance with a DisplayPort standard. Also, a two-way serial communication side-band channel is provided for setting up the lanes requirement and other communications on both sides. This channel may accommodate 3-wires (namely AUXP, AUXN and HPD) of communication into a single wire externally to both the devices on either side. Internal to the device, the signals through the three wires may be encoded, electrically transmitted across and then decoded on the other side. An extra layer of protocol may be defined on top of a standard, such as a DisplayPort Standard, to accomplish this task over 1-wire have it transmitted or received over 1-pin of the USB Port.

Figure 1A:
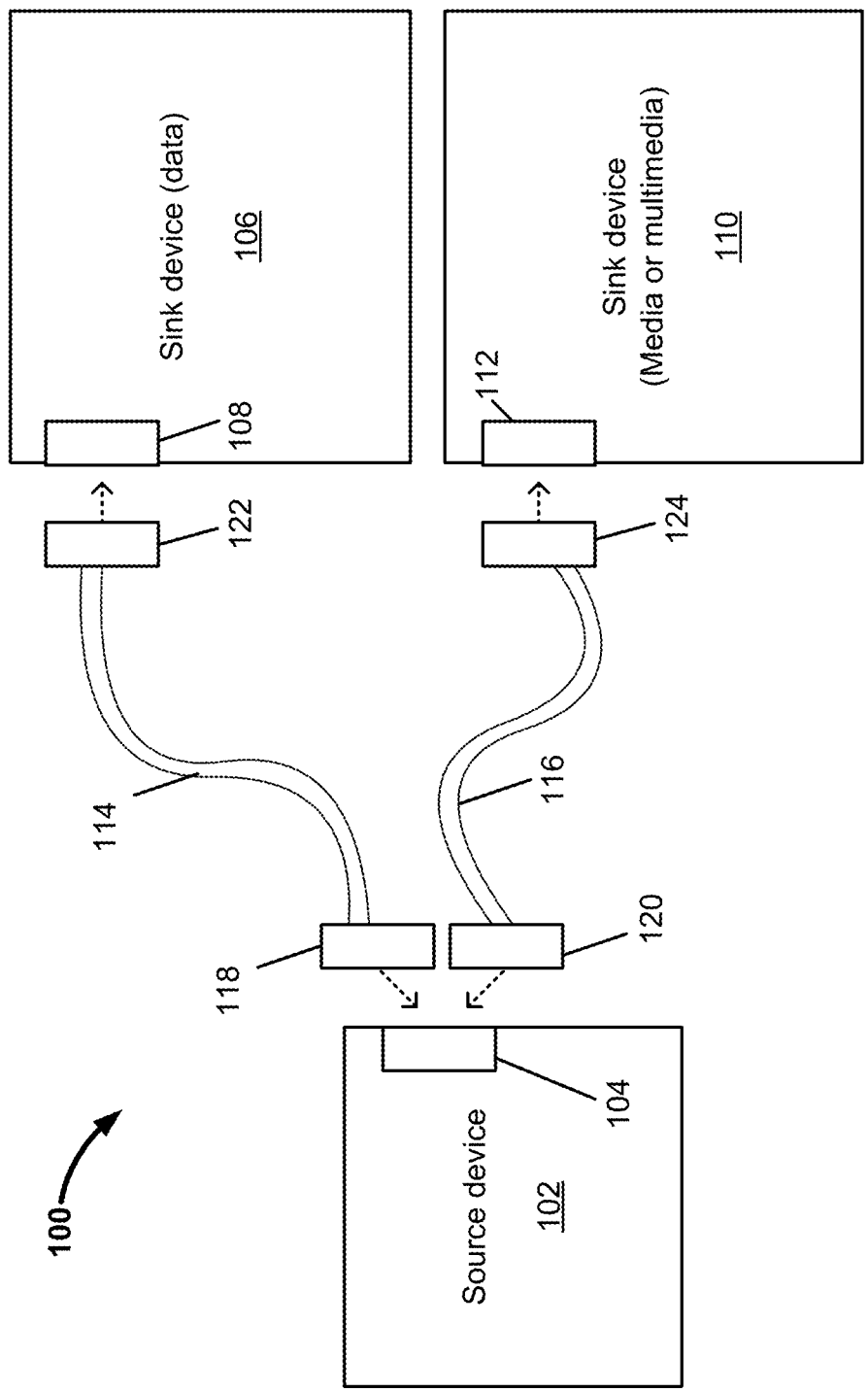
FIG. 1A is a block diagram of an environment for dual-mode data transfer of uncompressed multimedia contents or data communications.

FIG. 1A is an exemplary block diagram of an environment 100 for dual-mode data transfer of uncompressed media (or multimedia) contents or data communications. The environment 100 includes a system for transferring data according to various embodiments. The environment 100 includes a source device 102, a first sink device 106, and a second sink device 110. Source device 102 has a USB port 104, first sink device 106 includes a USB port 108, and second sink device 110 includes a DisplayPort port 112.

Source device 102 may provide an output of data in USB format or in another data transmission format over port 104. Source device 102 may communicate with first sink device 106 via USB cable 114 and with second sink device 110 via media cable 116. An exemplary source device 102 is discussed in more detail below with respect to FIG. 1B.

The USB port 104 and USB port 108 may be one of various types including, but not limited to, a Micro-USB connector in accordance with a USB 3.0 specification standard, a Mini- USB connector in accordance with a USB 2.0 specification standard, and a Micro-USB connector in accordance with a USB 2.0 specification standard. The term "port" may also be referred to herein as a receptacle or connector. Hence, "port" as used herein is merely explanatory for emphasizing the function as a receptacle included as part of a device that may accept a corresponding connector (plug).

A USB cable 114 may be used to couple source device 102 with first sink device 106 via USB ports 104 and 108 of devices 102 and 106, respectively. Device 106 may also be considered a master or a slave device, at least because USB transactions are bi-directional. Hence, either end of the USB connection (for example, device 106) may be considered either the master or the slave device in the connection, depending on who controls the transaction and what devices are connected on both sides. The USB cable 114 may have a USB connector 118 at one end and a USB connector 122 at the other end. The USB connectors 118 and 122 may each be configured to "plug" into the corresponding USB ports 104 and 108.

Media cable 116 may be used to couple source device 102 with second sink device 110. Media cable 116 includes a connector 120 at one end and a connector 124 at the other end. The connector 120 may be a USB connector configured to plug into port 104 of source device 102, and connector 124 may couple to port 112 of the second sink device 110. Media cable 116 may include conductors, circuits and other components to couple the connectors 120 and 124.

First sink device 106 may receive and/or transmit data in accordance with a USB standard or protocol. Though source device 102 may typically act as a "host" in a connection with first sink device 106, first sink device 106 may also act as a host in the connection. Examples of first sink device 106 include a camera, smart phone, and video cam.

Second sink device 110 may receive media (audio or video) or multimedia (both audio and video) signals via the media cable 116 and provide a media output (video and/or audio) or otherwise process the received data. Port 112 on second sink device 110 may be a media or multimedia port. In some embodiments, second sink device 110 is a Display Port compatible device, and port 112 is configured to receive a DisplayPort compatible connection. Port 112 and connector 124 may also be compatible with other media or multimedia standards. Examples of second sink device 110 include a projector, television, or other media or multimedia capable device.

Figure 1B:
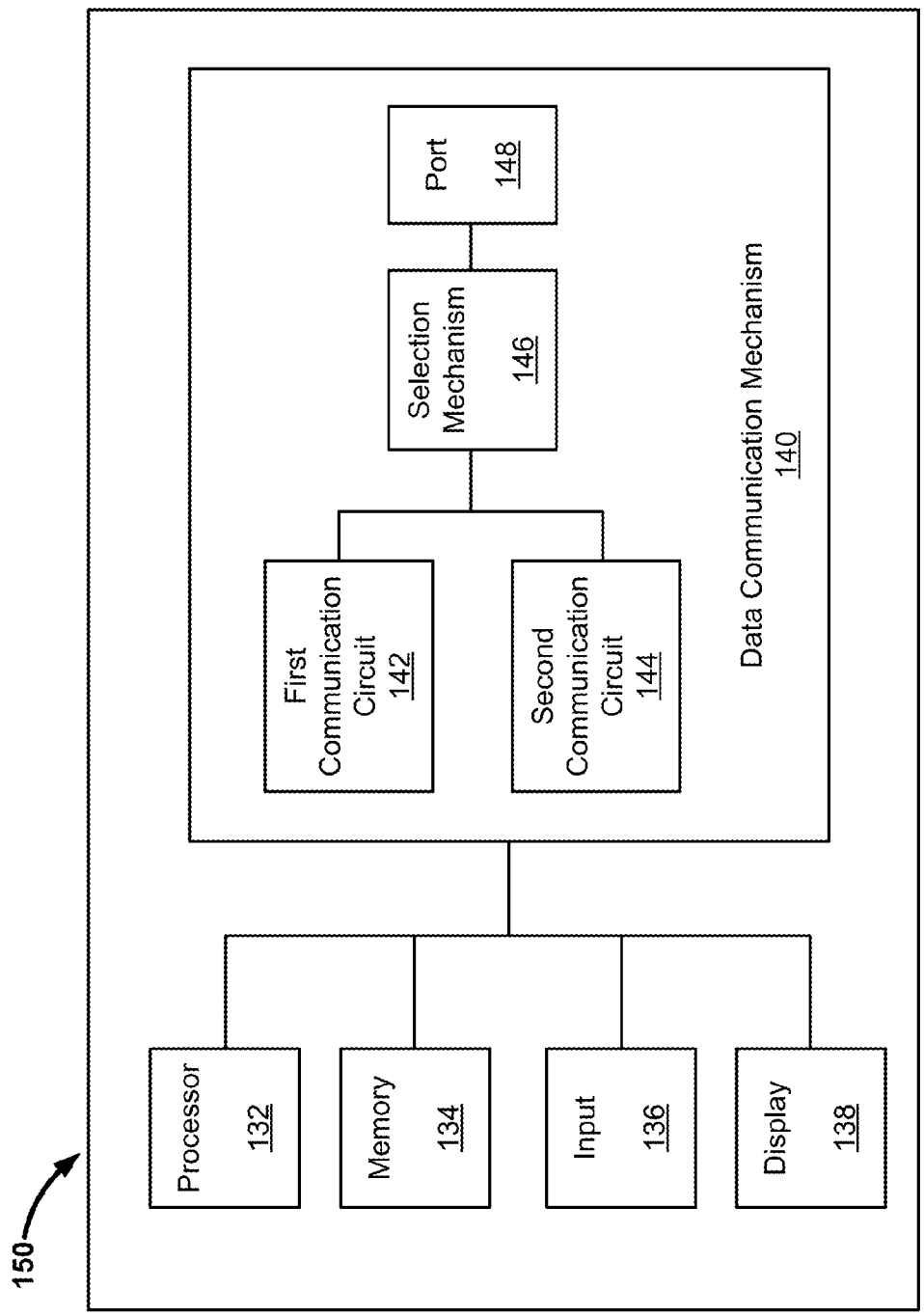
FIG. 1B is a block diagram of an exemplary source device.

FIG. 1B is a block diagram of an exemplary source device 150. Source device 150 may be used to implement source device 102 of FIG. 1A. Source device 150 includes a processor 132, memory 134, input 136, display 138, and data communication mechanism 140. Exemplary source device 150 may include additional or fewer components that those illustrated in FIG. 1B.

Processor 132 may be used to execute instructions that are stored in memory 134. Processor 132 may be implemented by one or more processors, one or more controllers, and other devices with execute instructions and control other devices.

Memory 134 may include a main memory for storing instructions as well as mass storage device, such as a magnetic disk drive or an optical disk drive. The mass storage device may include a non-volatile storage device for storing data and instructions for use by processor 132.

Input 136 may include one or more mechanisms for receiving data from a user or other system, such as but not limited to a keypad, various buttons, a touch screen, one or more microphones, and other input devices.

Display 138 may be a screen for providing an output to a user. The interface may be in the form of video or other media. The output may also be provided as audio, wireless data signal, or in some other data format over a suitable output mechanism (not illustrated in FIG. 1B).

Data communication mechanism 140 may include a first communication circuit 142, second communication circuit 144, selection mechanism 146, and port 148. Selection mechanism 146 may detect a connection type at port 148. Based on the detected connection type, selection mechanism 146 may enable communication through port 148 for either first communication circuit 142 or second communication circuit 144. The communication circuits 142 and 144 may communicate using different protocols, such as a USB 2.0 protocol, USB 3.0 protocol, a DataPort protocol, or some other protocol. The data signals sent by the different protocols of communication circuits 142 and 144 are configured to be sent over the same port 148. In some embodiments, data communication mechanism 140 may include more than two communication circuits and selectively configure communication over more than one port of source device 150. Exemplary data communication mechanisms are discussed in more detail below with respect to FIGS. 2, 4-11 and 14-15.

The source device 102 may be a device, portable or otherwise, having a USB port 104. The source device 102 may be, for example, small enough to be portable for a user, such as a cell phone or other mobile device. Mobile devices typically have a USB port operative for charging the battery of the device, and for data transfer and syncing with another device. The reduced size required for portability and transport may preclude adding another port for providing capability beyond these typical USB port capabilities.

Figure 2:
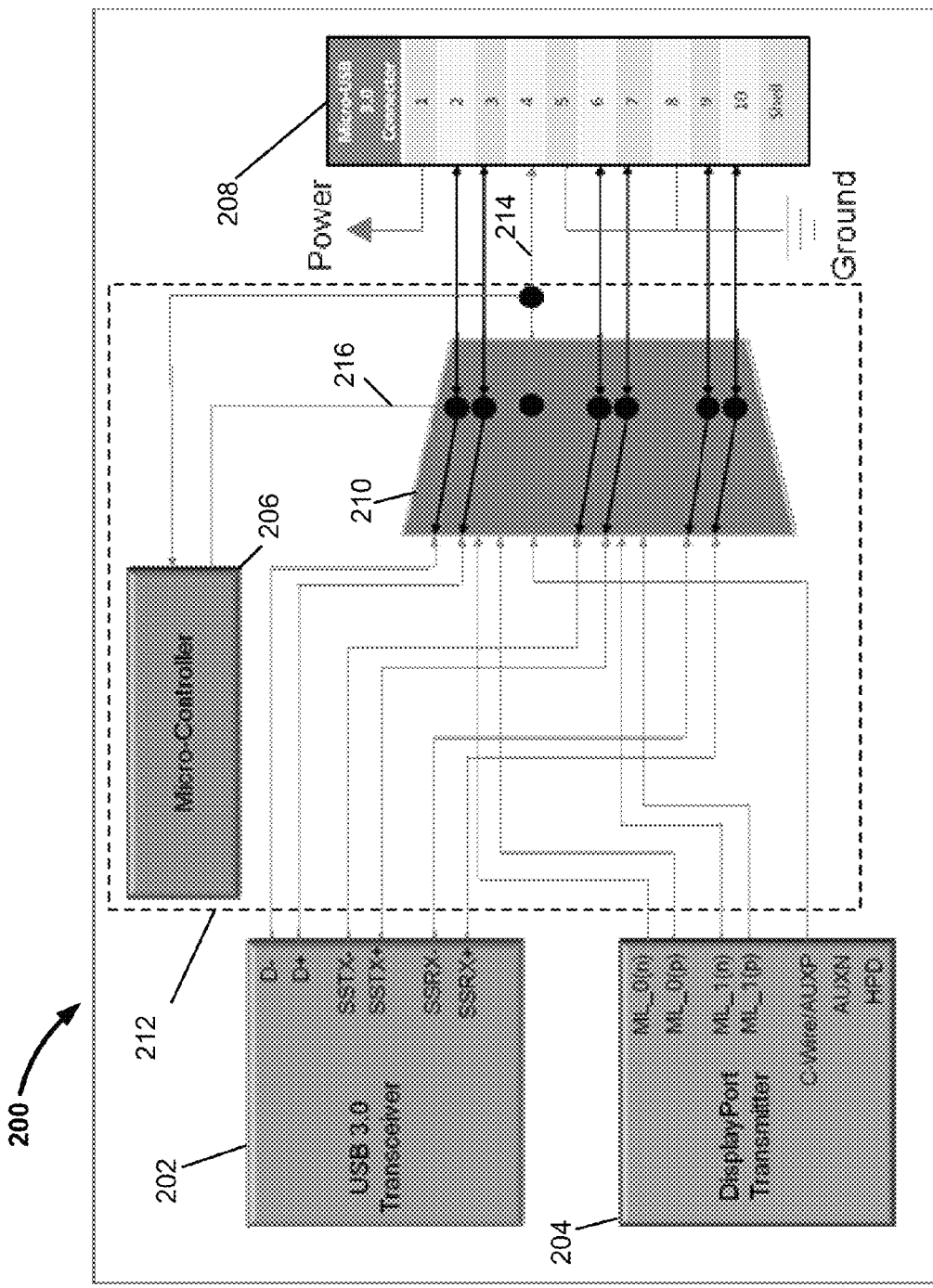
FIG. 2 is a block diagram of an exemplary data communication mechanism compatible with a Micro-USB 3.0 connector and selectively operating in a USB mode.

FIG. 2 is a block diagram of a exemplary system 200 for a source device having a Micro-USB 3.0 connector and selectively operating in a USB mode. The system 200 includes a USB 3.0 transceiver circuit 202, a DisplayPort transmitter circuit 204, a selection circuit 212, and a Micro-USB 3.0 connector 208. The USB 3.0 transceiver circuit 202 conforms to a USB 3.0 standard and may variously supply a data positive signal (D+), data negative signal (D−), super speed transmitter data positive signal (SSTX+), super speed transmitter data negative signal (SSTX−), super speed receiver data positive signal (SSRX+), and super speed receiver data negative signal (SSRX−). The D+ and D− signals are legacy USB 2.0 data signals, while the super speed signals are features of USB 3.0 for providing higher speed data communication.

The DisplayPort transmitter circuit 204 may be operative to transmit uncompressed high definition media signals. High definition media signals may include video signals having a resolution of at least a 720p, but may also include 720i, 1080i, 1080p video formats. In some embodiments, the uncompressed high definition media signals may be multimedia signals comprising both uncompressed high definition video data and compressed or uncompressed audio data.

DisplayPort transmitter circuit 204 may provide uncompressed high definition media or multimedia signals based at least in part on a DisplayPort standard. The signals may include at least one differential video data pair defining a lane in accordance with a DisplayPort standard. Two lanes are shown in the example in FIG. 2: lane number one differential pair, i.e., ML_0(n) and ML_0(p), and lane number two differential pair, i.e., ML_1(n) and ML_1(p). The DisplayPort transmitter circuit 204 provides uncompressed high definition media data that may include side-band communication data. In the example in FIG. 2, the side-band communication data is shown as a single C-wire signal that may be based on one or more of an Auxiliary channel positive signal (AUXP), an Auxiliary channel negative signal (AUXN), and a Hot Plug Detect signal (HPD) of the DisplayPort protocol.

In the environment 100 in FIG. 1, the source device 102 has a USB port 104. The Micro-USB 3.0 connector 208 is also referred to herein as the USB port 208 for the source device.

The selection circuit 212 includes a micro-controller 206 and a switch 210. In some embodiments, the switch 210 is an analog switch. The selection circuit 212 is operative to selectively couple the USB 3.0 transceiver circuit 202 or the DisplayPort transmitter circuit 204 to the USB port 208 based on an indication of a device type received through port 208. The indication may be received as a data format signal 214 received at a pin of the USB port 208 (see e.g., pin 4 of USB port 208). The pin of the USB port 208 may receive the device type indication from an external interface (see e.g., cables 114 and 116 in FIG. 1A). The data format signal 214 is coupled to the micro-controller 206. In some embodiments, the micro-controller 206 may generate a selection signal 216 based on the data format signal 214 to cause the switch 210 to selectively couple either the USB 3.0 transceiver circuit 202 or the DisplayPort transmitter circuit 204 to the USB port 208. The micro-controller 206 may be a standalone device or be embedded in another device, such as an application processor. The term "micro-controller" may also be referred to herein as a "controller".

The data format signal 214 provides an indication of a data format to communicate over port 208. According to various embodiments, a predetermined impedance may be coupled between one of the conductors of a cable (e.g., cables 114 and 116 in FIG. 1A) and ground in order to provide the indication to the USB connector (USB port) connected to the cable. For instance, referring to FIG. 1A, plugging in either respective connector 118 or 120 of the respective cables 114 and 116 into the USB port 104 (connector 208 in FIG. 2) provides an indication to the source device 102 of a data type associated with the cable. Although the indication is shown as the data format signal 214 received at pin 4 of connector 208, another suitable pin may be used to receive the indication.

Figure 3:
FIG. 3 is an exemplary table illustrating compatibility for various detection states of the system.

FIG. 3 is an exemplary table 300 illustrating compatibility for various detection states of the system. The detection state represents detection of the predetermined impedance coupled to the cable conductor to provide the device type indication. The USB specification and the USB On-The-Go (OTG) supplement thereto define various impedances and corresponding states for an ID pin of the USB connector, e.g. pin 4 of connector 208 in the micro-USB 3.0 example in FIG. 2.

The first five detection states (i.e., ground, floating, 124 k ohm, 68 k ohm, and 36.5 k ohm) each represent a particular defined state compatible with a USB standard. Any of these first five states may thus provide an indication of USB compatibility. According to various embodiments, the detection state associated with USB compatibility, provides an indication of a USB device type. In the example in FIG. 2, responsive to the indication of a detection state associated with USB compatibility, the micro-controller 206 may generate a selection signal 216 to cause the switch 210 to selectively couple the USB 3.0 transceiver 202 to the USB port 208. For example, a USB cable such as the USB cable 114 in FIG. 1A may provide one of ground, floating, 124 k ohm, 68 k ohm, and 36.5 k ohm impedance detection states in FIG. 3 to provide an indication of USB compatibility.

An HD uncompressed media data signal may be indicated at the ID pin. For example, the uncompressed media data signal may have a detection state associated with an impedance other than that for a USB detection state and distinguishable from any USB detection state. Examples of such an impedance include 20 k ohm, 15 k ohm, 10 k ohm, 5 k ohm, or some other level of impedance. Though a particular impedance level of 10 k ohm may be discussed herein, different levels of impedance may be used to associate an uncompressed media data signal from USB signals at an ID pin.

Figure 4:
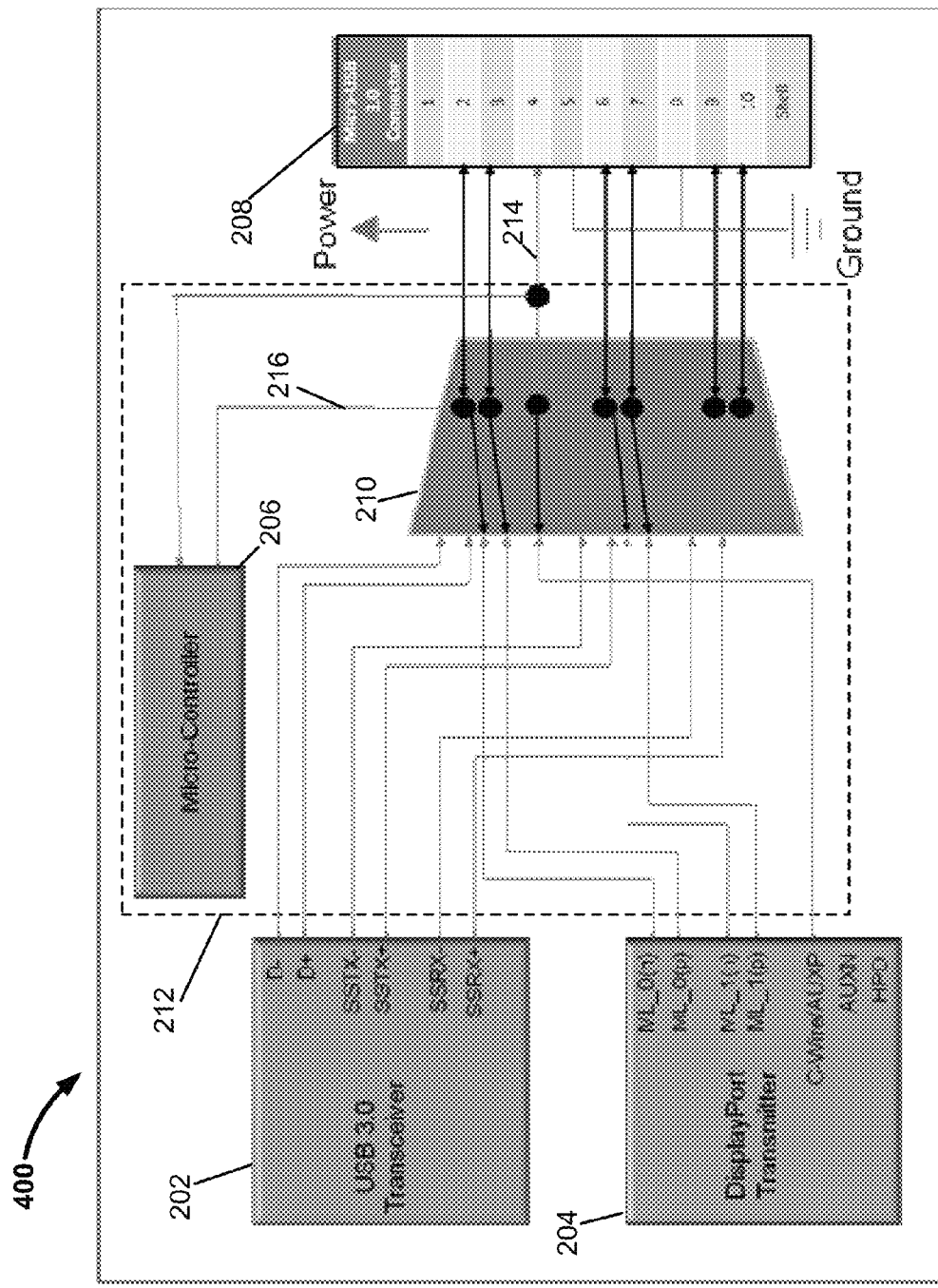
FIG. 4 is a block diagram of a exemplary data communication mechanism compatible with a Micro-USB 3.0 connector and selectively operating in a media mode.

According to various embodiments, a detection state shown in FIG. 3 corresponding to a 10 k ohm impedance indicates compatibility with a HD uncompressed media data signal cable, i.e., a media mode. Responsive to the indication of the media mode, the micro-controller 206 of selection circuit 212 may generate a selection signal 216 to cause the switch 210 to selectively couple the DisplayPort transmitter 604 to the USB port 208. This selective coupling and media mode operation may be as illustrated in FIG. 4, for example. FIG. 4 is a block diagram of a exemplary system 400 compatible with a Micro-USB 3.0 connector and selectively operating in a media mode.

If the media cable 116 in FIG. 1A provides the 10 k ohm impedance and couples the second sink device 110 and the source device 102, a system 400 in the source device 102 may couple signals from the DisplayPort transmitter 204 to the USB port 208 for supplying via the media cable 116 to the second sink device 110. The second sink device 110 may be operative to generate a display and/or audio presentation from the received signals.

Figure 5:
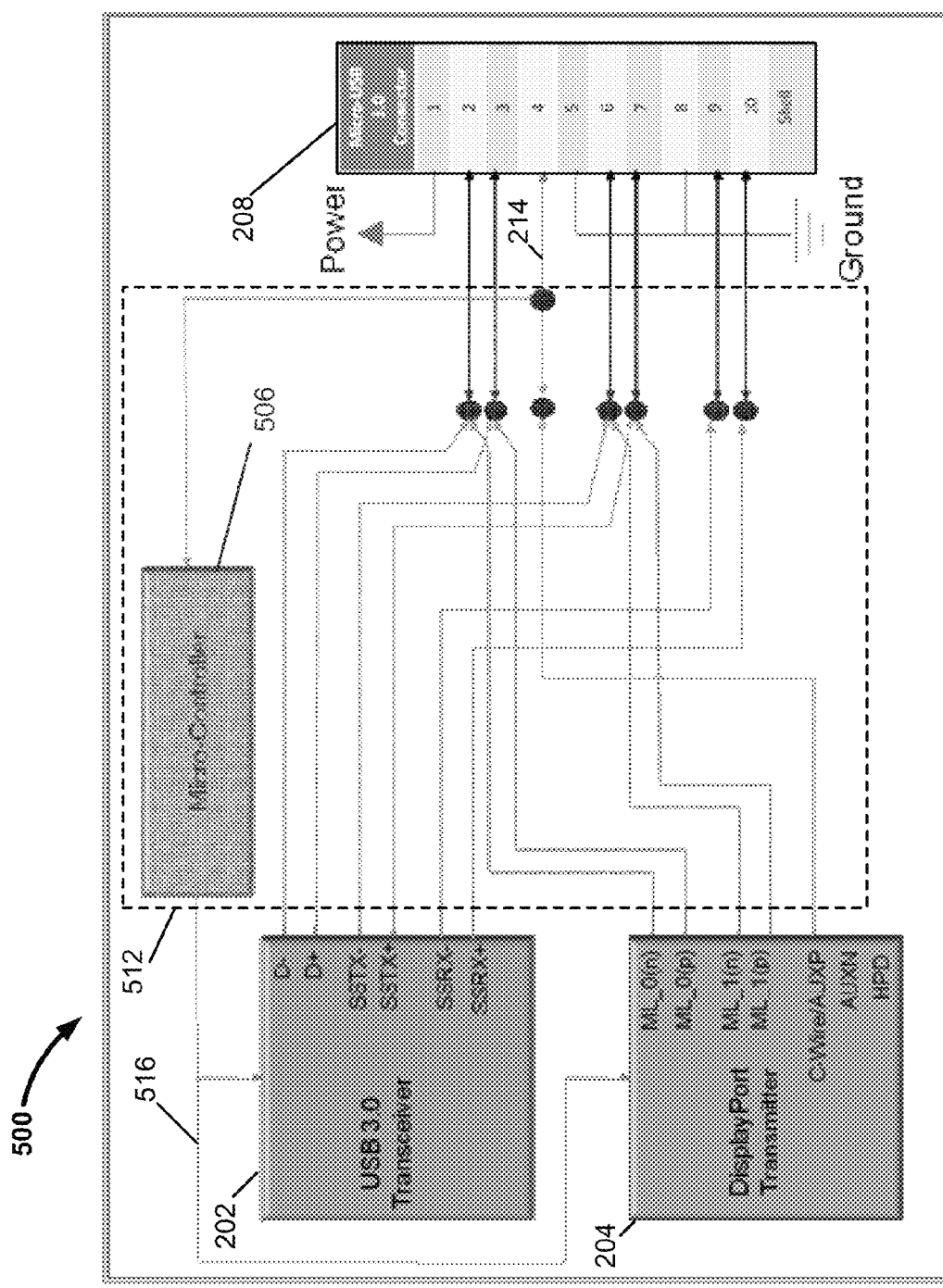
FIG. 5 is a block diagram of a exemplary data communication mechanism compatible with a Micro-USB 3.0 connector in accordance with some embodiments.

FIG. 5 is a block diagram of a exemplary system 500 for a source device having a Micro-USB connector in accordance with some embodiments. The system 500 includes a USB 3.0 transceiver circuit 202, a DisplayPort transmitter circuit 204, and a Micro-USB 3.0 connector 208, similar to the systems 200 and 400 in FIGS. 2 and 4. System 500 does, however, have a different selection circuit, i.e., selection circuit 512, which may not include a switch. The selection circuit 512 may include a micro-controller 506 coupled to the USB 3.0 transceiver circuit 202 and the DisplayPort transmitter circuit 204. Selected outputs from the USB 3.0 transceiver circuit 202 and DisplayPort transmitter circuit 204 to be selectively coupled to the same pin of the connector 208 may be joined as shown in the FIG. 5.

The micro-controller 506 of the selection circuit 512 may selectively couple the USB 3.0 transceiver circuit 202 or the DisplayPort transmitter circuit 204 to the USB port 208 based on a data format signal 214 received at the USB port 208. A selection signal 516 may be generated by the micro-controller 506. The USB 3.0 transceiver circuit 202 or the DisplayPort transmitter circuit 204 may be enabled to communicate with the USB port 208 based on the selection signal 516. The circuit 202 or 204 that is not enabled by selection circuit 512 in the system 500 will not communicate any output to connector 208. The micro-controller 506 may be a standalone device or be embedded in another device such as an application processor.

According to various embodiments, signals from the DisplayPort transmitter circuit 204 may be selectively coupled to different pins of the USB port, e.g., USB port/Micro-USB 3.0 connector 208 in FIGS. 2, 4, and 5. Tables 1, 2, and 3 illustrate schemes 1-36 for various combinations of DisplayPort signals routing to the Micro-USB 3.0 connector and Micro-USB 3.0 connector pin numbers that may be used in some embodiments.

TABLE 1

DisplayPort Signals Routing to the Micro-USB 3.0 Connector

| Scheme 1 | Scheme 2 | Scheme 3 | Scheme 4 | Scheme 5 | Scheme 6 | Scheme 7 | Scheme 8 | Scheme 9 | Scheme 10 | Scheme 11 | Scheme 12 | Micro-USB 3.0 Connector Pin Numbers |
|---|---|---|---|---|---|---|---|---|---|---|---|---|
| PWR | PWR | PWR | PWR | PWR | PWR | PWR | PWR | PWR | PWR | PWR | PWR | 1 |
| AUXN | AUXP | AUXN | AUXP | AUXN | AUXP | AUXN | AUXP | AUXN | AUXP | AUXN | AUXP | 2 |
| AUXP | AUXN | AUXP | AUXN | AUXP | AUXN | AUXP | AUXN | AUXP | AUXN | AUXP | AUXN | 3 |
| HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | 4 |
| Ground | Ground | Ground | Ground | Ground | Ground | Ground | Ground | Ground | Ground | Ground | Ground | 5 |
| ML_0(n) | ML_0(n) | ML_0(p) | ML_0(p) | ML_0(n) | ML_0(n) | ML_1(n) | ML_1(n) | ML_1(p) | ML_1(p) | ML_1(n) | ML_1(n) | 6 |
| ML_0(p) | ML_0(p) | ML_0(n) | ML_0(n) | ML_0(p) | ML_0(p) | ML_1(p) | ML_1(p) | ML_1(n) | ML_1(n) | ML_1(p) | ML_1(p) | 7 |
| Ground | Ground | Ground | Ground | Ground | Ground | Ground | Ground | Ground | Ground | Ground | Ground | 8 |
| ML_1(n) | ML_1(n) | ML_1(n) | ML_1(n) | ML_1(p) | ML_1(p) | ML_0(n) | ML_0(n) | ML_0(n) | ML_0(n) | ML_0(p) | ML_0(p) | 9 |
| ML_1(p) | ML_1(p) | ML_1(p) | ML_1(p) | ML_1(n) | ML_1(n) | ML_0(p) | ML_0(p) | ML_0(p) | ML_0(p) | ML_0(n) | ML_0(n) | 10 |

TABLE 2

DisplayPort Signals Routing to the Micro-USB 3.0 Connector

| Scheme 13 | Scheme 14 | Scheme 15 | Scheme 16 | Scheme 17 | Scheme 18 | Scheme 19 | Scheme 20 | Scheme 21 | Scheme 22 | Scheme 23 | Scheme 24 | Micro-USB 3.0 Connector Pin Numbers |
|---|---|---|---|---|---|---|---|---|---|---|---|---|
| PWR | PWR | PWR | PWR | PWR | PWR | PWR | PWR | PWR | PWR | PWR | PWR | 1 |
| ML_0(n) | ML_0(n) | ML_0(p) | ML_0(p) | ML_0(n) | ML_0(n) | ML_1(n) | ML_1(n) | ML_1(p) | ML_1(p) | ML_1(n) | ML_1(n) | 2 |
| ML_0(p) | ML_0(p) | ML_0(n) | ML_0(n) | ML_0(p) | ML_0(p) | ML_1(p) | ML_1(p) | ML_1(n) | ML_1(n) | ML_1(p) | ML_1(p) | 3 |
| HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | 4 |
| Ground | Ground | Ground | Ground | Ground | Ground | Ground | Ground | Ground | Ground | Ground | Ground | 5 |
| AUXN | AUXP | AUXN | AUXP | AUXN | AUXP | AUXN | AUXP | AUXN | AUXP | AUXN | AUXP | 6 |
| AUXP | AUXN | AUXP | AUXN | AUXP | AUXN | AUXP | AUXN | AUXP | AUXN | AUXP | AUXN | 7 |
| Ground | Ground | Ground | Ground | Ground | Ground | Ground | Ground | Ground | Ground | Ground | Ground | 8 |
| ML_1(n) | ML_1(n) | ML_1(n) | ML_1(n) | ML_1(p) | ML_1(p) | ML_0(n) | ML_0(n) | ML_0(n) | ML_0(n) | ML_0(p) | ML_0(p) | 9 |
| ML_1(p) | ML_1(p) | ML_1(p) | ML_1(p) | ML_1(n) | ML_1(n) | ML_0(p) | ML_0(p) | ML_0(p) | ML_0(p) | ML_0(n) | ML_0(n) | 10 |

TABLE 3

DisplayPort Signals Routing to the Micro-USB 3.0 Connector

| Scheme 25 | Scheme 26 | Scheme 27 | Scheme 28 | Scheme 29 | Scheme 30 | Scheme 31 | Scheme 32 | Scheme 33 | Scheme 34 | Scheme 35 | Scheme 36 | Micro-USB 3.0 Connector Pin Numbers |
|---|---|---|---|---|---|---|---|---|---|---|---|---|
| PWR | PWR | PWR | PWR | PWR | PWR | PWR | PWR | PWR | PWR | PWR | PWR | 1 |
| ML_0(n) | ML_0(n) | ML_0(p) | ML_0(p) | ML_0(n) | ML_0(n) | ML_1(n) | ML_1(n) | ML_1(p) | ML_1(p) | ML_1(n) | ML_1(n) | 2 |
| ML_0(p) | ML_0(p) | ML_0(n) | ML_0(n) | ML_0(p) | ML_0(p) | ML_1(p) | ML_1(p) | ML_1(n) | ML_1(n) | ML_1(p) | ML_1(p) | 3 |
| HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | 4 |
| Ground | Ground | Ground | Ground | Ground | Ground | Ground | Ground | Ground | Ground | Ground | Ground | 5 |
| ML_1(n) | ML_1(n) | ML_1(n) | ML_1(n) | ML_1(p) | ML_1(p) | ML_0(n) | ML_0(n) | ML_0(n) | ML_0(n) | ML_0(n) | ML_0(p) | 6 |
| ML_1(p) | ML_1(p) | ML_1(p) | ML_1(p) | ML_1(n) | ML_1(n) | ML_0(p) | ML_0(p) | ML_0(p) | ML_0(p) | ML_0(n) | ML_0(n) | 7 |

TABLE 3-continued

| DisplayPort Signals Routing to the Micro-USB 3.0 Connector | | | | | | | | | | | | Micro-USB 3.0 Connector Pin Numbers |
|---|---|---|---|---|---|---|---|---|---|---|---|---|
| Ground | Ground | Ground | Ground | Ground | Ground | Ground | Ground | Ground | Ground | Ground | Ground | 8 |
| AUXN | AUXP | AUXN | AUXP | AUXN | AUXP | AUXN | AUXP | AUXN | AUXP | AUXN | AUXP | 9 |
| AUXP | AUXN | AUXP | AUXN | AUXP | AUXN | AUXP | AUXN | AUXP | AUXN | AUXP | AUXN | 10 |

Figure 6:
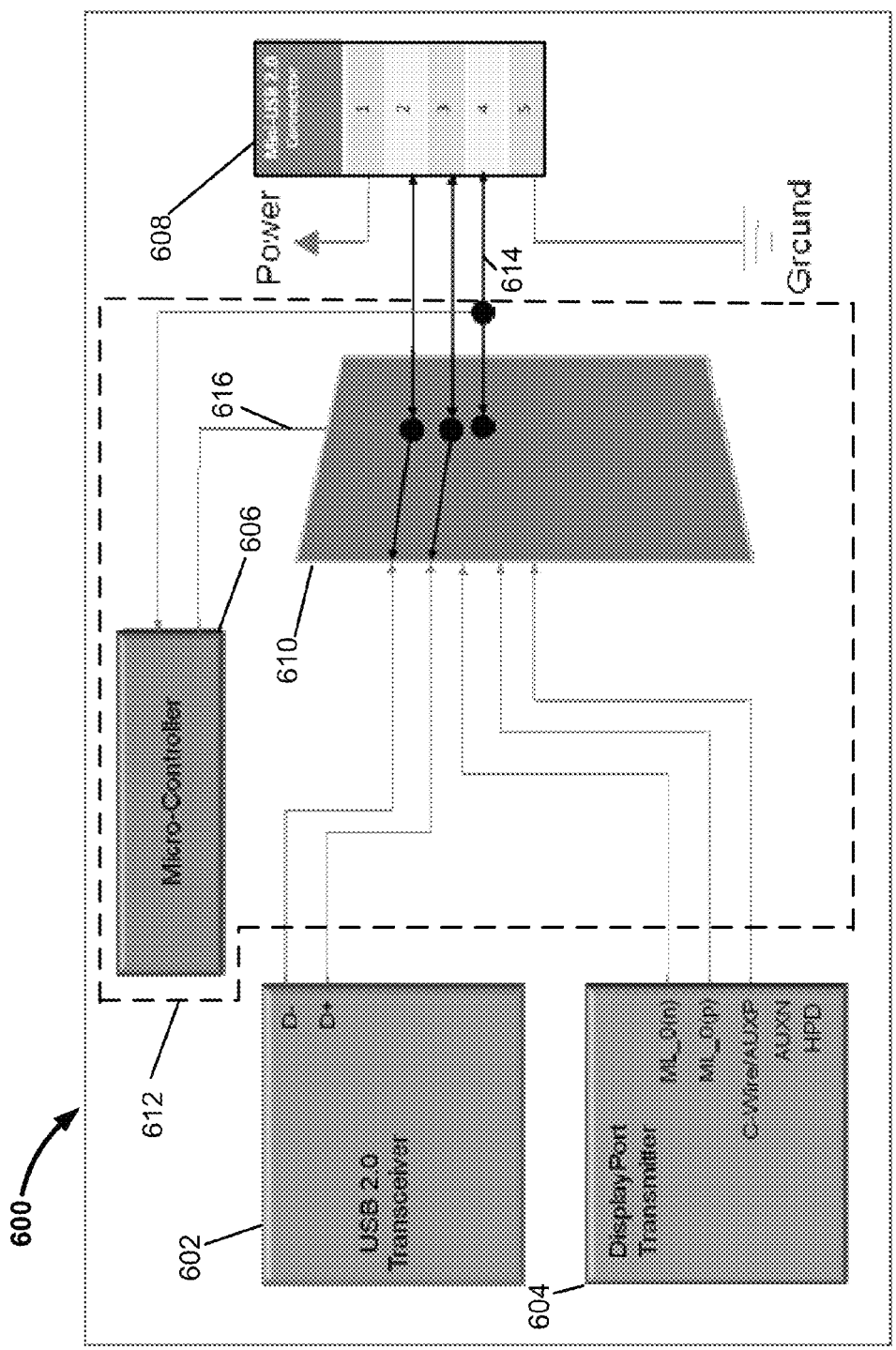
FIG. 6 is a block diagram of a exemplary data communication mechanism compatible with a Mini-USB 2.0 connector and selectively operating in a USB mode.

FIG. 6 is a block diagram of a exemplary system 600 for a source device having a Mini-USB 2.0 connector and selectively operating in a USB mode. The system 600 includes a USB 2.0 transceiver circuit 602, a DisplayPort transmitter circuit 604, a selection circuit 612, and a Mini-USB 2.0 connector 608. The USB 2.0 transceiver circuit 602 conforms to a USB 2.0 standard and may supply a data positive signal (D+), and a data negative signal (D−). The Mini-USB 2.0 connector 608 is also referred to herein as USB port 608 for the source device, see e.g., source device 102 and USB port 104 in FIG. 1A.

The DisplayPort transmitter circuit 604 may transmit uncompressed high definition media signals. The uncompressed high definition media signals may be multimedia signals comprising both uncompressed high definition video and compressed or uncompressed audio. DisplayPort transmitter circuit 604 provides uncompressed high definition media or multimedia signals based at least in part on a DisplayPort standard and include at least one differential video data pair, i.e., ML_0(n) and ML_0(p), defining a lane in accordance with a DisplayPort standard. The DisplayPort transmitter circuit 604 provides uncompressed high definition media data that may include side-band communication data. In the example in FIG. 6, the side-band communication data is shown as a single C-wire signal that may be based on one or more of an Auxiliary channel positive signal (AUXP), an Auxiliary channel negative signal (AUXN), and a Hot Plug Detect signal (HPD) of the DisplayPort protocol.

The selection circuit 612 includes a micro-controller 606 and a switch 610. The switch 610 may be an analog switch or other type of switch. The selection circuit 612 may selectively couple the USB 2.0 transceiver circuit 602 or the DisplayPort transmitter circuit 604 to the USB port 608 based on an indication in form of a data format signal 614 received at the USB port 608. The data format signal 614 may be received at a pin of the USB port 608 (see e.g., pin 4 of USB port 608 in the example). The pin of the USB port 608 may receive the device type indication from an external interface (see e.g., cables 114 and 116 in FIG. 1A). The data format signal 614 is coupled to the micro-controller 606. In some embodiments, the micro-controller 606 may generate a selection signal 616 based on the data format signal 614 to cause the switch 610 to selectively couple either the USB 2.0 transceiver circuit 602 or the DisplayPort transmitter circuit 604 to the USB port 608. The micro-controller 606 may be a standalone device or be embedded in another device, such as an application processor.

The data format signal 614 is a signal as described above for the data format signal 214 in FIG. 2, except for being received at a different type of connector (i.e., a Micro-USB 3.0 connector 208 in FIG. 2 and Mini-USB 2.0 connector 608 in FIG. 6). In the example in FIG. 6, responsive to the indication of a detection state associated with USB compatibility, the micro-controller 606 generates a selection signal 616 to cause the switch 610 to couple the USB 2.0 transceiver 602 to the USB port 608. For example, a USB cable such as USB cable 114 in FIG. 1A may provide one of ground, floating, 124 k ohm, 68 k ohm, and 36.5 k ohm impedance detection states in FIG. 3 to provide an indication of USB compatibility.

Figure 7:
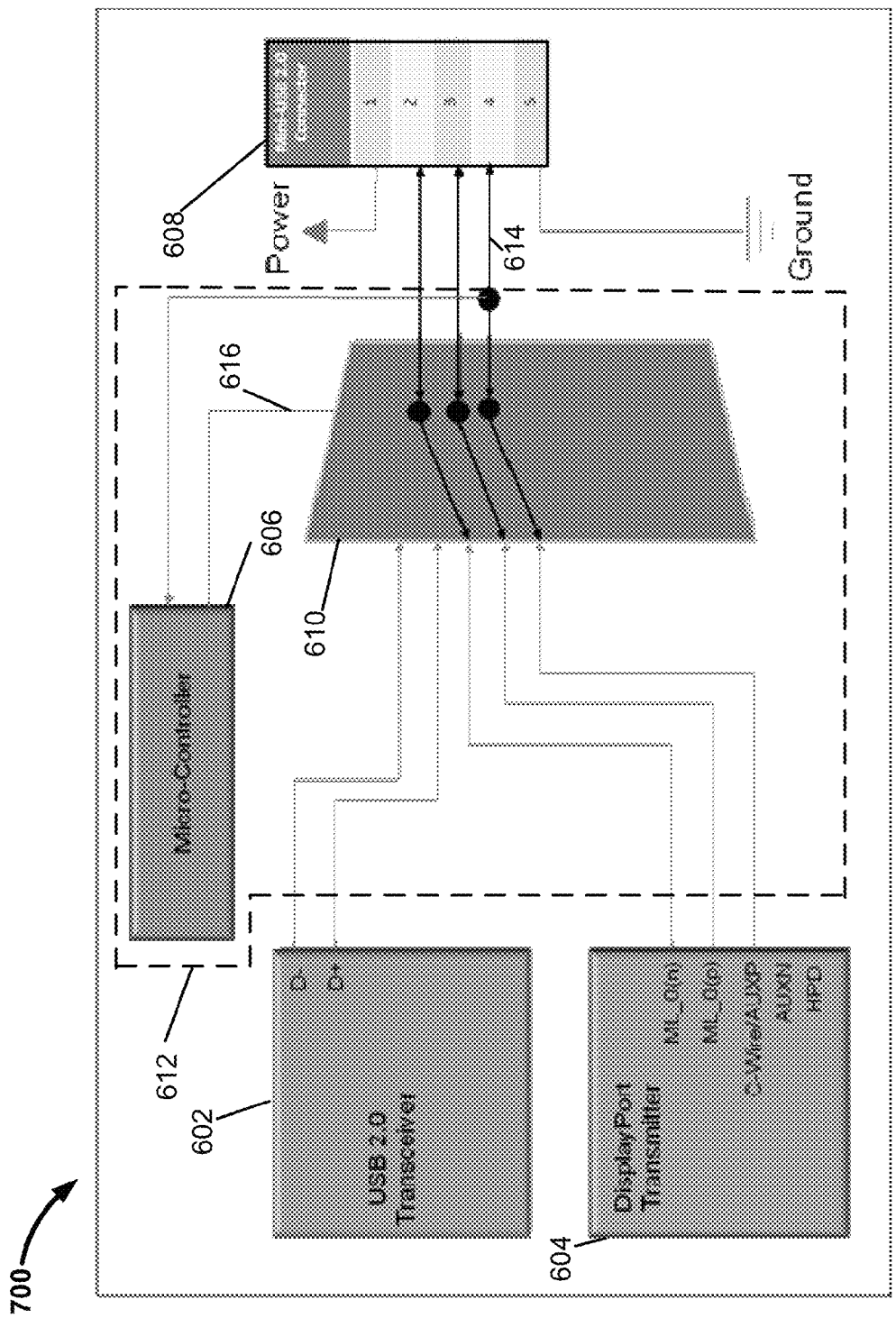
FIG. 7 is a block diagram of a exemplary data communication mechanism compatible with a Mini-USB 2.0 connector and selectively operating in a media mode.

As described above, a detection state shown in FIG. 3 corresponding to a 10 k ohm impedance indicates compatibility with a HD uncompressed media data signal cable, i.e., a media mode. In response to an indication of a media mode, the micro-controller 606 of selection circuit 612 generates a selection signal 616 to cause the switch 610 to couple the DisplayPort transmitter 604 to the USB port 608. FIG. 7 is a block diagram of a exemplary system 700 for a source device having a Mini-USB 2.0 connector and selectively operating in a media mode.

By way of example, if the media cable 116 in FIG. 1A provides the 10 k ohm impedance and couples the second sink device 110 and the source device 102, a system 700 in the source device 102 may couple signals from the DisplayPort transmitter 604 to the USB port 608 for supplying via the media cable 116 to the sink device 110. The second sink device 110 may be operative to generate a display and/or audio presentation from the received signals. The process of selective transmission of data as a function of the device type indication is further illustrated in FIGS. 12 and 13, as described further above.

Figure 8:
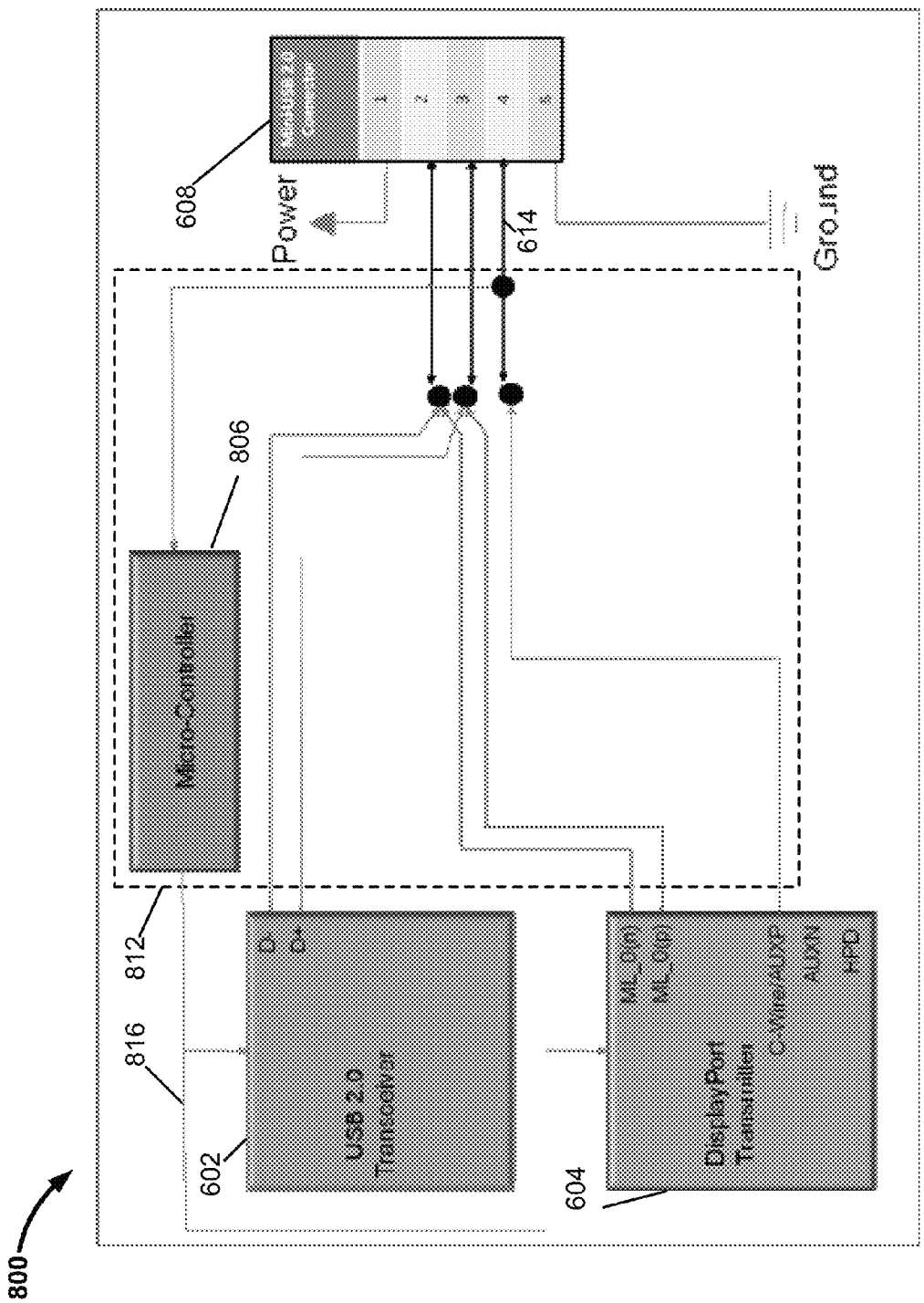
FIG. 8 is a block diagram of a exemplary data communication mechanism compatible with a Mini-USB 2.0 connector in accordance with some embodiments.

FIG. 8 is a block diagram of a exemplary system 800 for a source device having a Mini-USB 2.0 connector in accordance with some embodiments. The system 800 includes a USB 2.0 transceiver circuit 602, a DisplayPort transmitter circuit 604, and a Mini-USB 2.0 connector 608, similar to the systems 600 and 700 in FIGS. 6 and 7. System 800 has a different selection circuit, i.e., selection circuit 812, which does not include a switch. The selection circuit 812 includes a micro-controller 806 coupled to the USB 2.0 transceiver circuit 602 and the DisplayPort transmitter circuit 604. Certain outputs from the USB 2.0 transceiver circuit 602 and DisplayPort transmitter circuit 604 to be selectively coupled to the same pin of the connector 608 may be joined as shown in FIG. 8.

The micro-controller 806 of the selection circuit 812 may selectively couple the USB 2.0 transceiver circuit 602 or the DisplayPort transmitter circuit 604 to the USB port 608 based on a data format signal 614 received at the USB port 608. A selection signal 816 may be generated by the micro-controller 806. The USB 2.0 transceiver circuit 602 or the DisplayPort transmitter circuit 604 may be enabled to communicate with the USB port 608 based on the selection signal 816. The micro-controller 806 may be a standalone device or be embedded in another device such as an application processor.

According to various embodiments, signals from the DisplayPort transmitter circuit 604 may be selectively coupled to different pins of the USB port, e.g., Mini-USB 2.0 connector 608 in FIGS. 6, 7, and 8. Table 4 illustrates schemes 1-12 for various combinations of DisplayPort signals routing to the Mini-USB 2.0 connector and Mini-USB 2.0 connector pin numbers that may be used in some embodiments.

TABLE 4

DisplayPort Signals Routing to the Mini-USB 2.0 Connector

| Scheme 1 | Scheme 2 | Scheme 3 | Scheme 4 | Scheme 5 | Scheme 6 | Scheme 7 | Scheme 8 | Scheme 9 | Scheme 10 | Scheme 11 | Scheme 12 | Mini-USB 2.0 Connector Pin Numbers N/A |
|---|---|---|---|---|---|---|---|---|---|---|---|---|
| AUXP | AUXN | AUXP | AUXN | ML_0(p) | ML_0(p) | ML_0(n) | ML_0(n) | ML_0(p) | ML_0(p) | ML_0(n) | ML_0(n) | 1 |
| ML_0(n) | ML_0(n) | ML_0(p) | ML_0(p) | ML_0(n) | ML_0(n) | ML_0(p) | ML_0(p) | AUXP | AUXN | AUXP | AUXN | 2 |
| ML_0(p) | ML_0(p) | ML_0(n) | ML_0(n) | AUXP | AUXN | AUXP | AUXN | ML_0(n) | ML_0(n) | ML_0(p) | ML_0(p) | 3 |
| HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | 4 |
| Ground | Ground | Ground | Ground | Ground | Ground | Ground | Ground | Ground | Ground | Ground | Ground | 5 |

Figure 9:
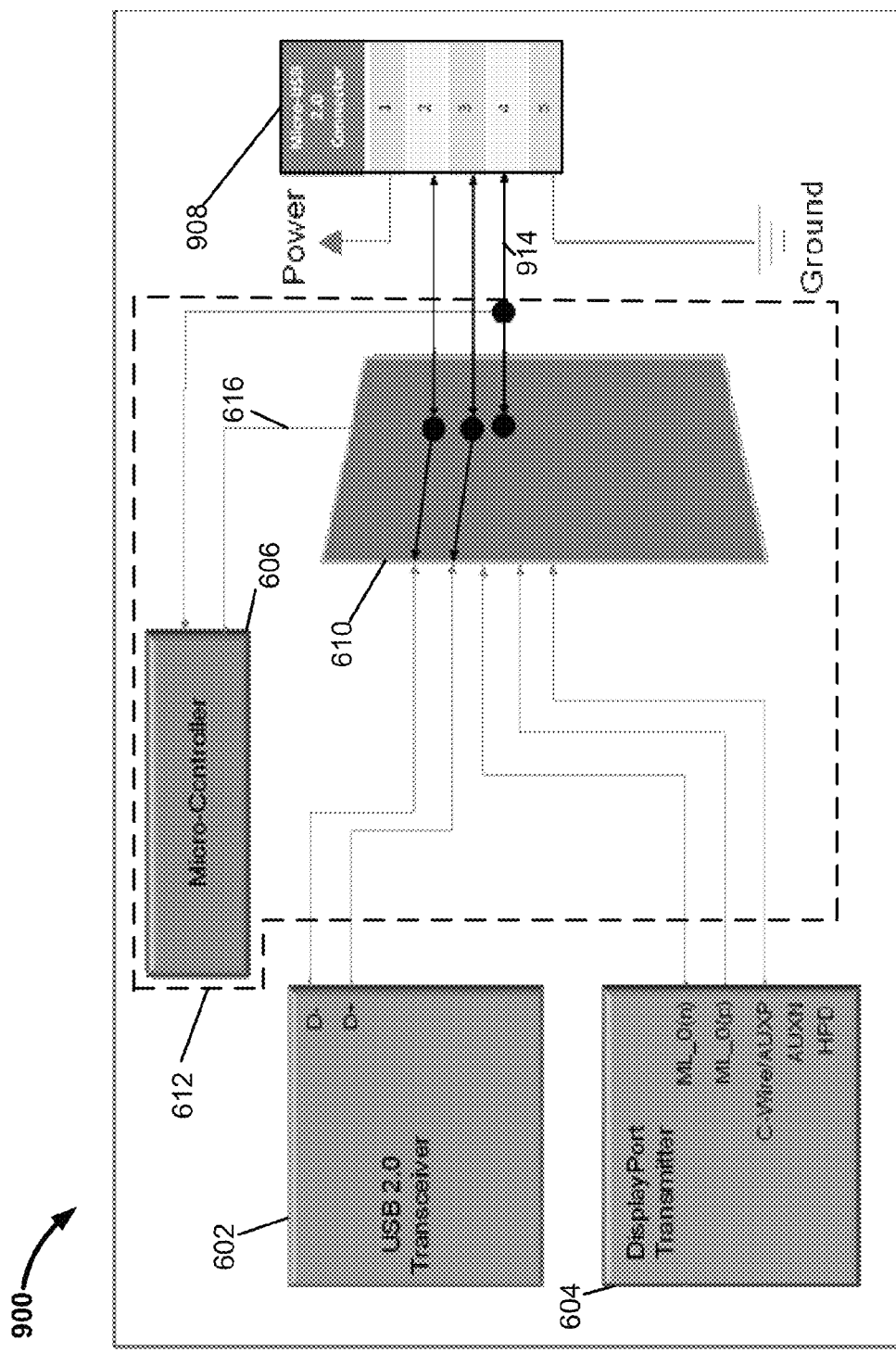
FIG. 9 is a block diagram of a exemplary data communication mechanism compatible with a Micro-USB 2.0 connector and selectively operating in a USB mode.

FIG. 9 is a block diagram of a exemplary system 900 for a source device having a Micro-USB 2.0 connector and selectively operating in a USB mode. The only differences between the system 900 and the system 600 are the type of USB 2.0 connector in the system and the data format signal received at that different type of USB 2.0 connector. More specifically, the system 900 has a Micro-USB 2.0 connector 908 for the USB port and a data format signal 914 received thereat. In contrast, system 600 has a Mini-USB connector 608 for the USB port and a data format signal 614 received thereat. Otherwise, the systems 600 and 900 are the same and illustrate the USB mode wherein the USB 2.0 transceiver circuit 602 is coupled to the respective USB port. Therefore, FIG. 9 is a system as described above for FIG. 6, except for the connector and data format signal differences identified above.

Figure 10:
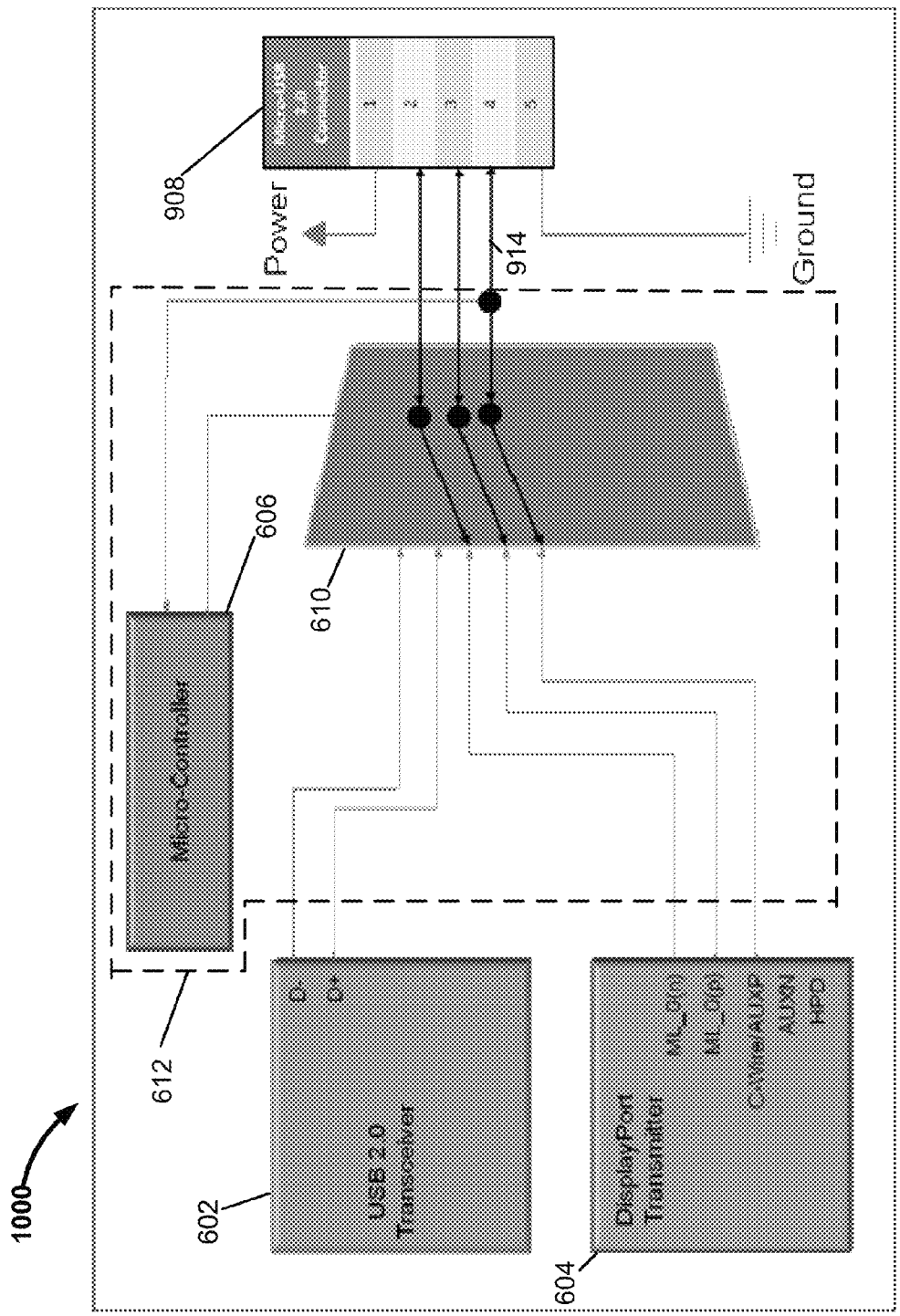
FIG. 10 is a block diagram of a exemplary data communication mechanism compatible with a Micro-USB 2.0 connector and selectively operating in a media mode.

FIG. 10 is a block diagram of a exemplary system 1000 for a source device having a Micro-USB 2.0 connector and selectively operating in a media mode. The system 700 in FIG. 7 and the system 1000 both illustrate the media mode. The only differences are the type of USB 2.0 connector in the system and the data format signal received at that different type of USB 2.0 connector. More specifically, the system 1000 has a Micro-USB 2.0 connector 908 for the USB port and a data format signal 914 received thereat. In contrast, system 700 has a Mini-USB connector 608 for the USB port and a data format signal 614 received thereat. Otherwise, the systems 600 and 1000 are the same and both illustrate the media mode wherein the DisplayPort transmitter circuit 604 is coupled to the respective USB port. Therefore, FIG. 10 is a system as described above for FIG. 7, except for the connector and data format signal differences identified above.

Figure 11:
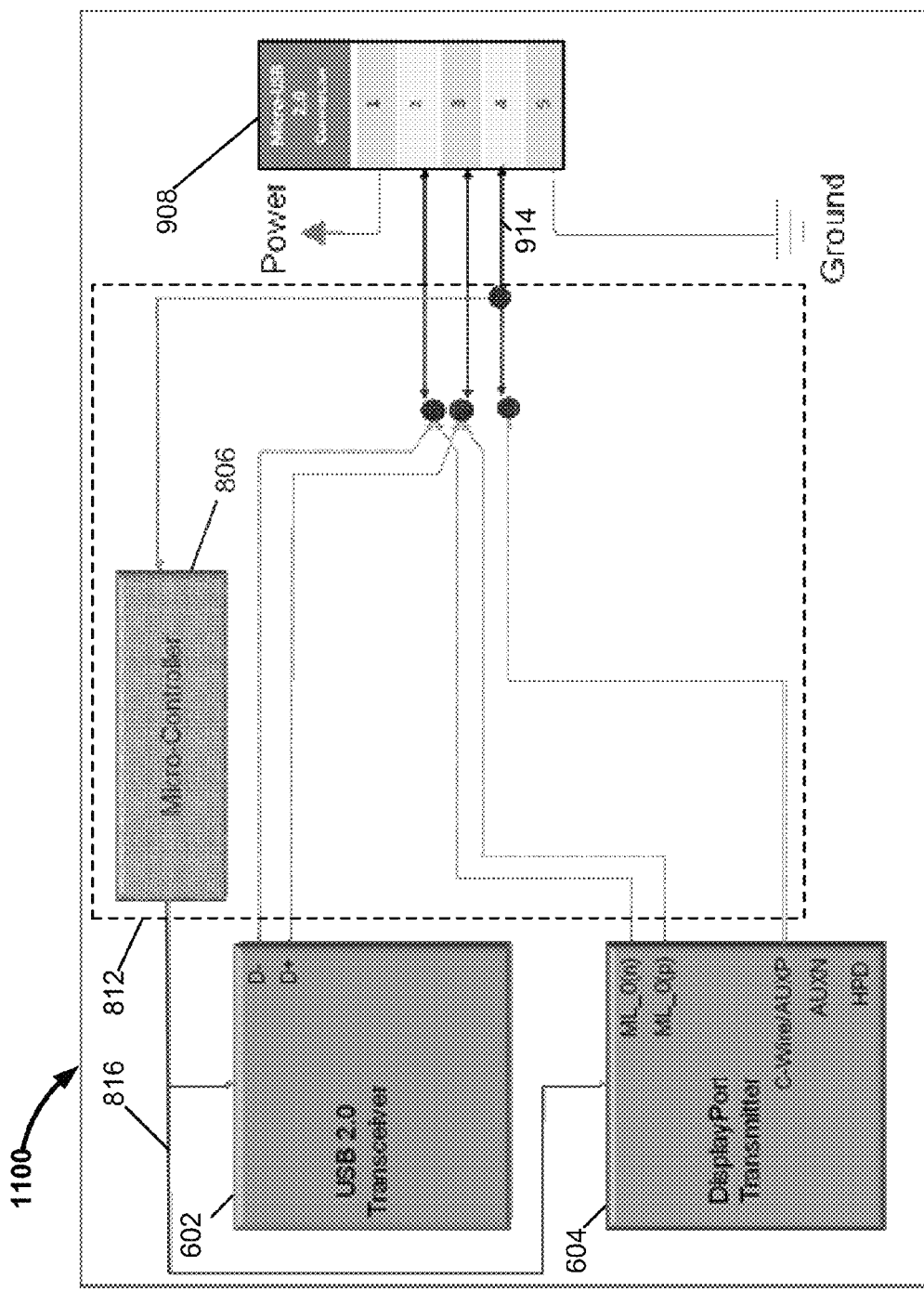
FIG. 11 is a block diagram of a exemplary data communication mechanism compatible with a Micro-USB 2.0 connector in accordance with some embodiments.

FIG. 11 is a block diagram of a exemplary system 1100 for a source device having a Micro-USB 2.0 connector in accordance with some embodiments. The only differences between the system 1100 and the system 800 in FIG. 8 are the type of USB 2.0 connector in the system and the data format signal received at that different type of USB 2.0 connector. More specifically, the system 1100 has a Micro-USB 2.0 connector 908 for the USB port and a data format signal 914 received thereat. In contrast, system 800 has a Mini-USB connector 608 for the USB port and a data format signal 614 received thereat. Otherwise, the systems 1100 and 800 are the same and both illustrate a configuration having a selection circuit 812 that does not include a separate switch. Therefore, FIG. 11 is a system as described above for FIG. 8, except for the connector and data format signal differences identified above.

According to various embodiments, signals from the DisplayPort transmitter circuit 604 may be selectively coupled to different pins of the USB port, e.g., Micro-USB 2.0 connector 908 in FIGS. 9, 10, and 11. Table 5 illustrates schemes 1-12 for various combinations of DisplayPort signals routing to the Micro-USB 2.0 connector and Micro-USB 2.0 connector pin numbers that may be used in some embodiments.

TABLE 5

DisplayPort Signals Routing to the Micro-USB 2.0 Connector

| Scheme 1 | Scheme 2 | Scheme 3 | Scheme 4 | Scheme 5 | Scheme 6 | Scheme 7 | Scheme 8 | Scheme 9 | Scheme 10 | Scheme 11 | Scheme 12 | Micro-USB 2.0 Connector Pin Numbers N/A |
|---|---|---|---|---|---|---|---|---|---|---|---|---|
| AUXP | AUXN | AUXP | AUXN | ML_0(p) | ML_0(p) | ML_0(n) | ML_0(n) | ML_0(p) | ML_0(p) | ML_0(n) | ML_0(n) | 1 |
| ML_0(n) | ML_0(n) | ML_0(p) | ML_0(p) | ML_0(n) | ML_0(n) | ML_0(p) | ML_0(p) | AUXP | AUXN | AUXP | AUXN | 2 |
| ML_0(p) | ML_0(p) | ML_0(n) | ML_0(n) | AUXP | AUXN | AUXP | AUXN | ML_0(n) | ML_0(n) | ML_0(p) | ML_0(p) | 3 |
| HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | HPD (thru MCU) | 4 |
| Ground | Ground | Ground | Ground | Ground | Ground | Ground | Ground | Ground | Ground | Ground | Ground | 5 |

Figure 12:
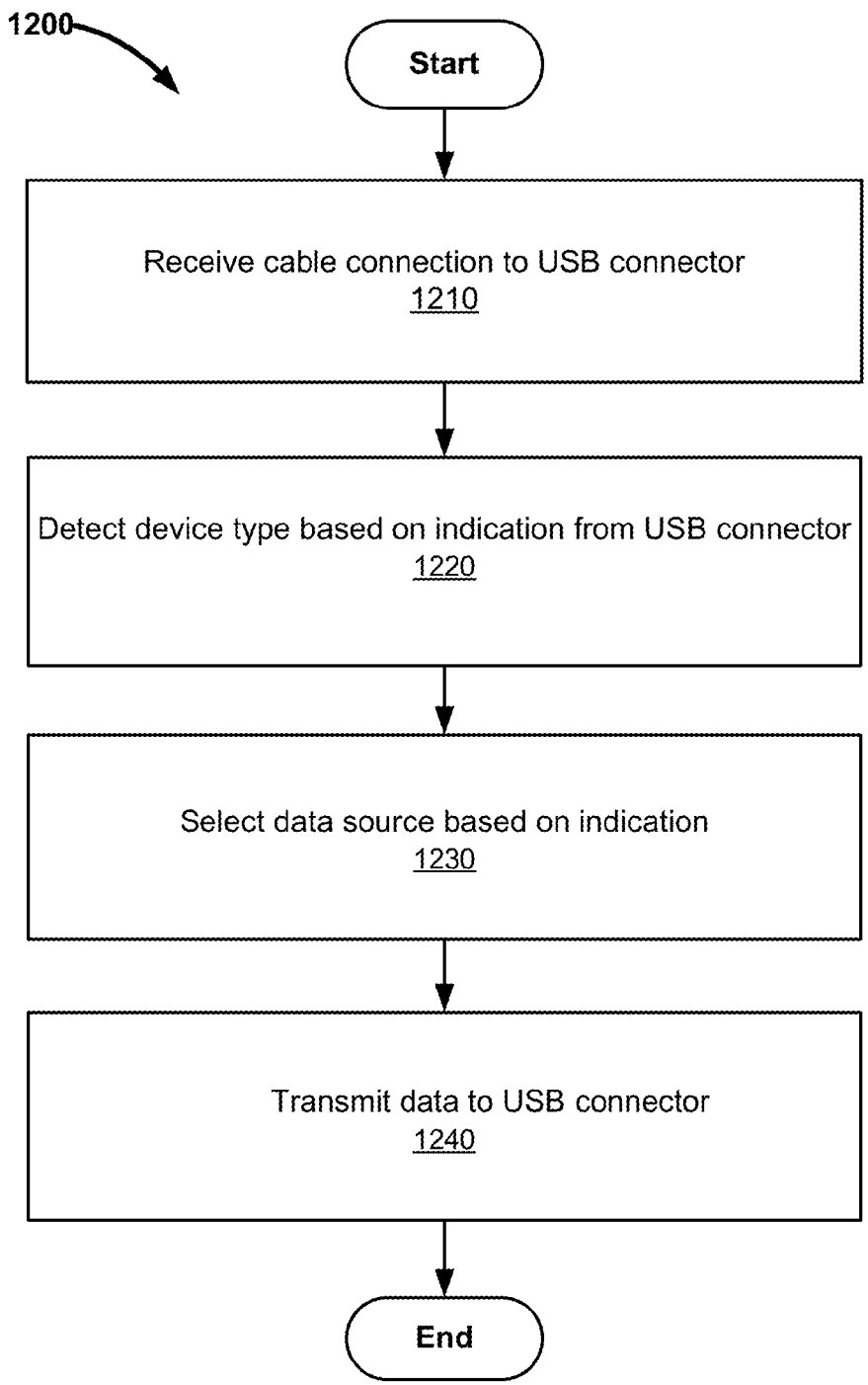
FIG. 12 is a flow chart of an exemplary method for transferring data.

FIG. 12 is a flow chart of an exemplary method 1200 for transferring data. A cable connection to the USB port (see e.g., ports 104 and 208 in FIGS. 1A and 2 respectively) is received at step 1210. A device type is detected based on an indication from the USB connector at step 1220 (see e.g., detection state/compatibility in FIG. 3). Detecting a device is discussed in more detail below with regards to the method of FIG. 13. A data source is selected based on the indication at step 1230. According to various embodiments, selection may be made between a USB protocol data source and an uncompressed high definition media data source (see e.g., FIG. 2). Data is transmitted to the USB connector at step 1240.

Figure 13:
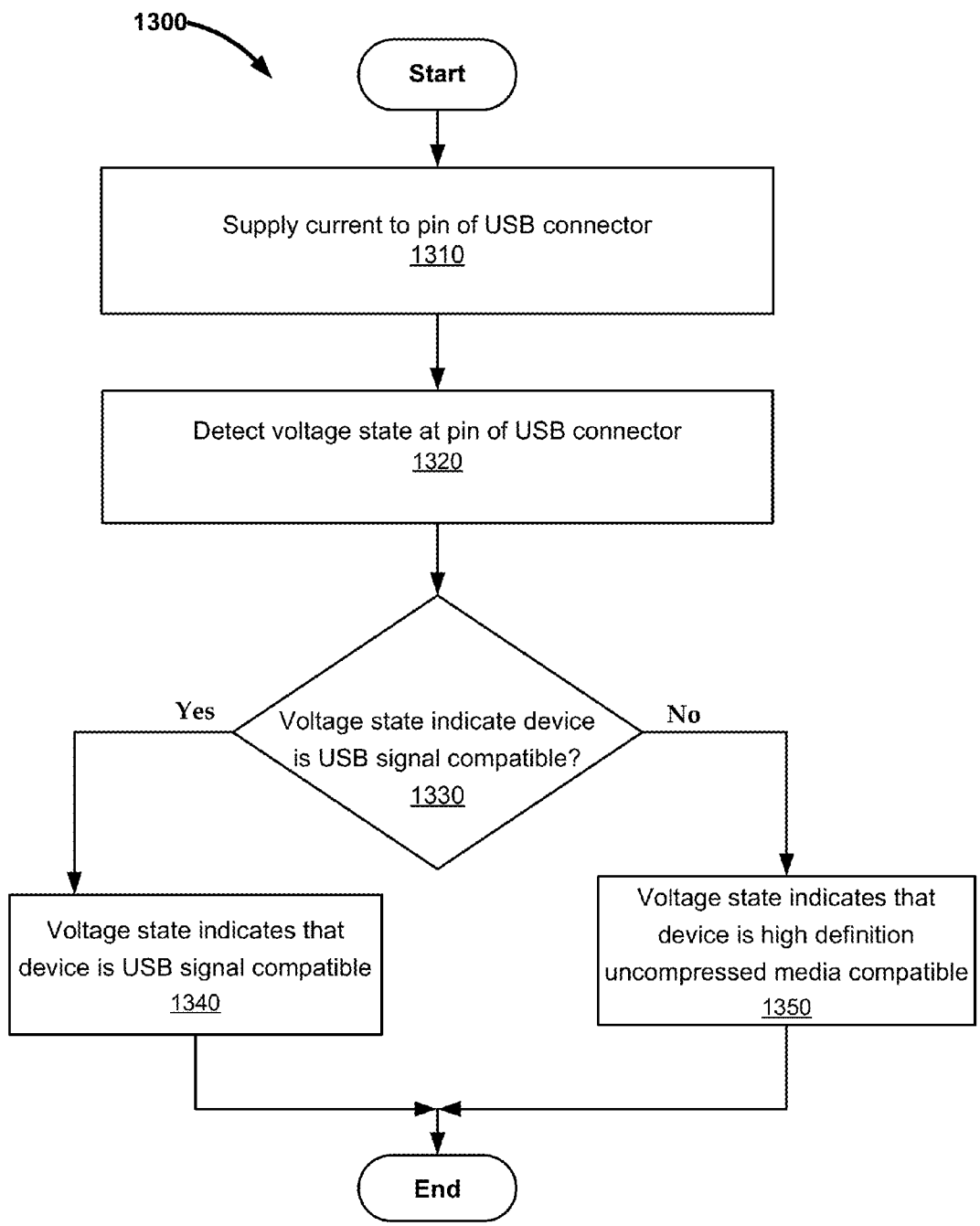
FIG. 13 is a flow chart of an exemplary method for detecting the device type based on the indication from the USB connector.

FIG. 13 is a flow chart of an exemplary method 1300 for detecting the device type based on the indication from the USB connector. A current may be supplied to a pin of USB connector at step 1310. The pin may be associated with an identification signal, such as for example pin 4 of a micro-USB 3.0 compatible port. A voltage state is detected at pin of USB connector at step 1320. The voltage state may be the voltage detected at the particular pin when a current is provided to the pin. A determination is made at step 1330 whether the voltage state indicates the device is USB signal compatible. The determination may be made based on the voltage state (i.e., voltage level, as indicated in FIG. 3). If the voltage state indicates that the device is USB signal compatible, the process proceeds to step 1340 where the device type is set as USB compatible accordingly. If the voltage state indicates that the device is not USB signal compatible, the device type is set as being high definition uncompressed media compatible at step 1350, and the process proceeds to the end.

Figure 14:
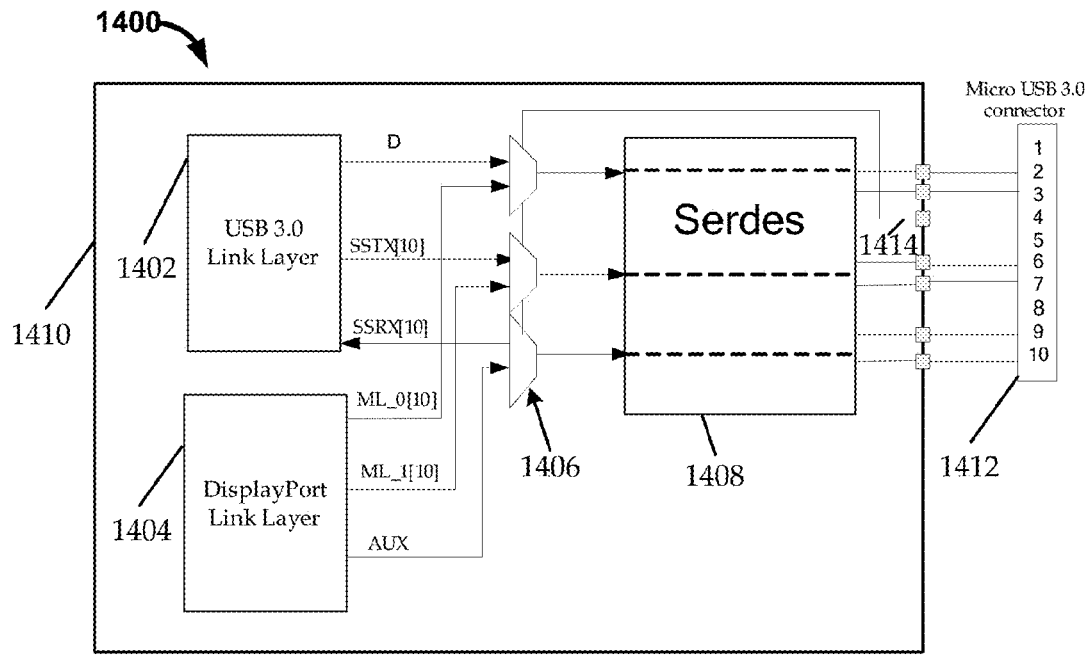
FIG. 14 is a block diagram of a exemplary data communication mechanism compatible with a Micro-USB 3.0 connector in accordance with some embodiments.

FIG. 14 is a block diagram of a exemplary system 1400 for a source device having a Micro-USB 3.0 connector in accordance with some embodiments. The system 1400 includes a semiconductor device 1410 and a Micro-USB 3.0 connector 1412 coupled thereto. The Micro-USB 3.0 connector 1412 is a USB port for coupling to an external interface having a mating connector. The semiconductor device 1410 may include a USB 3.0 link layer circuit 1402, a DisplayPort link layer circuit 1404, a multiplexer 1406, and a serializer/deserializer (Serdes) circuit 1408. The USB 3.0 Link Layer circuit 1402 may be a USB transceiver circuit operative to send and receive USB 3.0 protocol signals, such as D, SSTX[10], and SSRX[10] shown in FIG. 14. The DisplayPort link layer circuit 1404 may be a transmitter circuit operative to transmit uncompressed high definition media signals, such as ML_0[10], ML_1[10], and AUX. ML_0[10] and ML_1[10] that represent respective DisplayPort main link lane numbers 0 and 1 for uncompressed high definition video and/or audio data. AUX represents a side-band communication signal. The multiplexer 1406 is configurable to selectively couple the USB 3.0 Link Layer circuit 1402 or the DisplayPort link layer circuit 1404 to the Serdes circuit 1408 based on a data format signal 1414 received at the USB port 1412 from the external interface. Since the USB 3.0 parallel data speed is 500 MHz and DisplayPort data speed is 270 MHz, a digital multiplexer 1406 configurable for switching between the two types of data and respective data speeds may be used.

The data format signal 1414 provides a device type indication and may be based on an impedance (see e.g., FIGS. 3, 12 and 13 described above regarding detecting a device type based on the indication). The data format signal 1414 is also described above with regards to other data format signals received at various connectors including data format signal 214 in FIG. 2 for a Micro-USB 3.0 connector, data format signal 614 in FIG. 6 for a Mini-USB 2.0 connector, and data format signal 914 in FIG. 9 for a Micro-USB 2.0 connector. Although the data format signal 1414 is shown at pin 4 of the Micro-USB 3.0 connector 1412, a different suitable pin may be used in some embodiments.

According to various embodiments of the system 1400, the multiplexer 1406 is operative to selectively couple the USB 3.0 Link Layer circuit 1402 to the Serdes circuit 1408 in response to the data format signal 1414 being indicative of a USB data format, i.e., USB mode. The multiplexer 1406 may be operative to selectively couple DisplayPort link layer circuit 1404 to the Serdes circuit 1408 in response to the data format signal 1414 being indicative of a media data format, i.e., media mode. In some embodiments, the Serdes circuit 1408 is operative to provide a plurality of signals configured for transmission via the Micro-USB 3.0 connector 1412 to the external interface. The configured plurality of signals from Serdes circuit 1408 may be coupled to the Micro-USB 3.0 connector 1412, i.e., the USB port.

Although the system 1400 includes a Micro-USB 3.0 connector, other types of USB connectors may be used including, but not limited to, various Micro-USB 2.0 connector types and Mini-USB 2.0 connector types. An exemplary system having a Micro-USB 2.0 connector is illustrated in FIG. 15.

Figure 15:
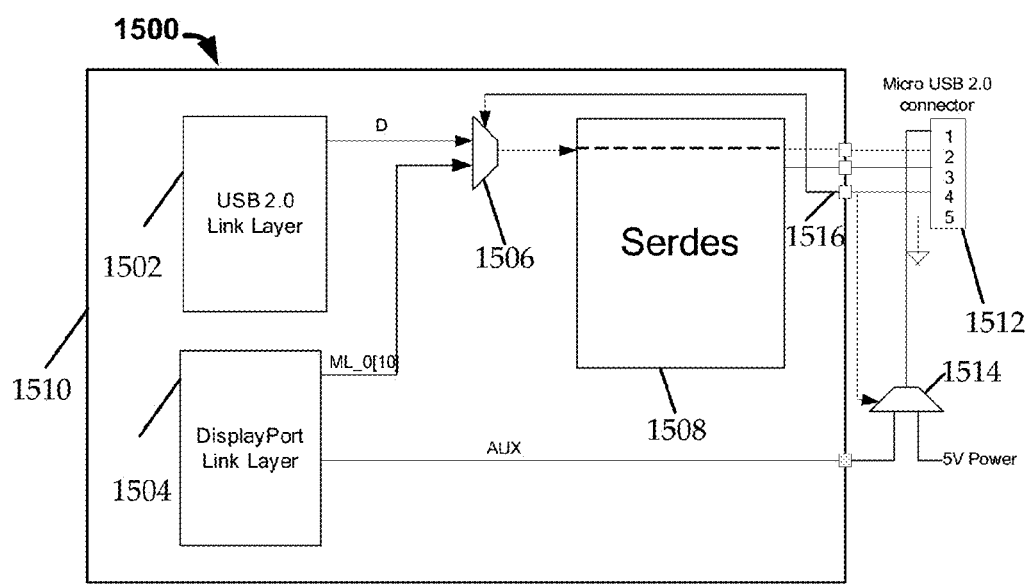
FIG. 15 is a block diagram of a exemplary data communication mechanism compatible with a Micro-USB 2.0 connector in accordance with some embodiments.

FIG. 15 is a block diagram of a exemplary system 1500 for a source device having a Micro-USB 2.0 connector in accordance with some embodiments. The system 1500 includes a semiconductor device 1510 and a Micro-USB 2.0 connector 1512 coupled thereto. The Micro-USB 2.0 connector 1512 is a USB port for coupling to an external interface having a mating connector. The semiconductor device 1510 may include a USB 2.0 link layer circuit 1502, a DisplayPort link layer circuit 1504, a multiplexer 1506, and a serializer/deserializer (Serdes) circuit 1508. The USB 2.0 Link Layer circuit 1502 may be a USB transceiver circuit operative to send and receive USB 2.0 protocol signals, such as D shown in FIG. 15. The DisplayPort link layer circuit 1504 may be a transmitter circuit operative to transmit uncompressed high definition media signals, such as ML_0[10] and AUX. ML_0[10] represents a DisplayPort main link lane number 0 for uncompressed high definition video and/or audio data. AUX represents a side-band communication signal. The multiplexer 1506 is configurable to selectively couple the USB 2.0 Link Layer circuit 1502 or the DisplayPort link layer circuit 1504 to the Serdes circuit 1508 based on a data format signal 1514 received at the USB port 1512 from the external interface. Since the USB 2.0 parallel data speed is 480 MHz and DisplayPort data speed is 270 MHz, a digital multiplexer 1506 configurable for switching between the two types of data and respective data speeds may be used.

The data format signal 1514 provides a device type indication and may be based on an impedance (see e.g., FIGS. 3, 12 and 13 regarding detecting a device type based on the indication). The data format signal 1514 is also described above with regards to other data format signals received at various connectors including data format signal 214 in FIG. 2 for a Micro-USB 3.0 connector, data format signal 614 in FIG. 6 for a Mini-USB 2.0 connector, and data format signal 914 in FIG. 9 for a Micro-USB 2.0 connector. Although the data format signal 1514 is shown at pin 4 of the Micro-USB 2.0 connector 1514, a different suitable pin may be used in some embodiments.

According to various embodiments of the system 1500, the multiplexer 1506 is operative to selectively couple the USB 2.0 Link Layer circuit 1502 to the Serdes circuit 1508 in response to the data format signal 1514 being indicative of a USB data format, i.e., USB mode. The multiplexer 1506 may be operative to selectively couple the DisplayPort link layer circuit 1504 to the Serdes circuit 1508 in response to the data format signal 1514 being indicative of a media data format, i.e., media mode. As shown in FIG. 15, the ML_0[10] signal is coupled to the multiplexer 1506 and may be configured by the Serdes circuit 1508 for coupling to the USB port in the media mode.

In some embodiments, a 5V power signal and the AUX side-band communication signal from the DisplayPort link layer circuit 1504 are coupled to a multiplexer 1506. Based on the data format signal 1516, the multiplexer 1506 selectively couples the AUX signal of the 5V power signal to the Micro-USB 2.0 connector 1512, e.g., pin 1 in FIG. 15. In the USB mode, the 5V power may be coupled to pin 1 to provide power for charging, etc., whereas, in the media mode the AUX signal may be coupled to pin 1 for side-band communication The Serdes circuit 1508 may be operative to provide a plurality of signals configured for transmission via the Micro-USB 2.0 connector 1512 to the external interface. The configured plurality of signals from Serdes circuit 1508 may be coupled to the Micro-USB 2.0 connector 1512, i.e., the USB port.

As discussed above in reference to FIG. 1A, the media cable 116 may be used to couple source device 102 with second sink device 110. The media cable 116 may provide an indication of the media mode and may couple the second sink device 110 and the source device 102. In the media mode, a system (e.g., system 400 in FIG. 4) in the source device 102 may couple uncompressed high definition media signals from the DisplayPort transmitter circuit 204 to the USB port 208 for supplying via the media cable 116 to second sink device 110. Second sink device 110 may receive media or multimedia signals via the media cable 116 and provide a media output (video and/or audio) or otherwise process the received data. Port 112 of second sink device 110 may be a media or multimedia port. In some embodiments, second sink device 110 is a Display Port compatible device, and port 112 is configured to receive a DisplayPort compatible connection. Port 112 and connector 124 may also be compatible with other media or multimedia standards. Second sink device 110 may be operative to generate a display and/or audio presentation from the received signals. Examples of second sink device 110 include a projector, television, or other media or multimedia capable device.

Figure 16:
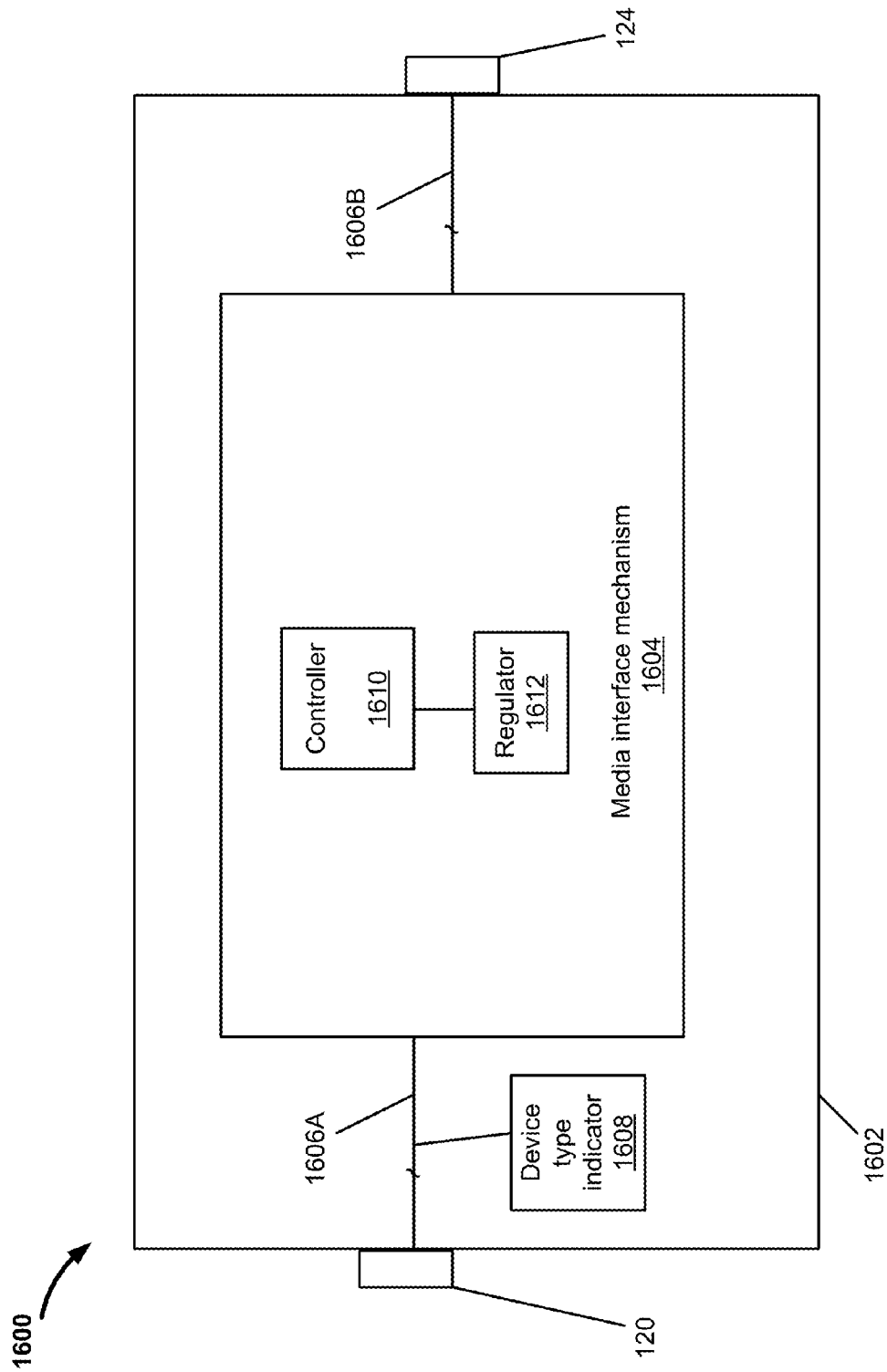
FIG. 16 is a block diagram of an exemplary interface assembly.

FIG. 16 is a block diagram of an exemplary interface assembly 1600 which may be used to implement media cable 116 of FIG. 1A. Interface assembly 1600 may include connector 120 at one end and connector 124 at the other end. Connector 120 may be a USB connector configured to plug into port 104 of source device 102. Connector 124 may be a media connector configured to plug into port 112 of second sink device 110.

The interface assembly 1600 may also include an assembly 1602 coupled between connectors 120 and 124. Assembly 1602 may include a media interface mechanism ("circuit") 1604, a first set of conductors 1606A, a second set of conductors 1606B, and a device type indicator 1608. First set of conductors 1606A and second set of conductors 1606B may be respective portions of an electrical cable.

Device type indicator 1608 may be coupled to at least one of the conductors of first set of conductors 1606A. Device type indicator 1608 may supply an indication to a pin of the USB connector 120. If a USB port (e.g., USB port 208 in FIG. 4) is coupled to USB connector 120, the indication may be received as a data format signal 214 at a pin of USB port 208 (see e.g., pin 4 of USB port 208). The pin of the USB port 208 may receive the device type indicating compatibility with an HD uncompressed media data signal from media cable 116, i.e., a media mode. For example, the uncompressed media data signal may have a detection state for the media mode associated with an impedance other than that for a USB detection state and distinguishable from any USB detection state. As described above, examples of such an impedance include 20 k ohm, 15 k ohm, 10 k ohm, 5 k ohm, or some other level of impedance. The device type indicator 1608 may include the impedance coupled between a conductor of first set of conductors 1606A and a reference potential such as ground. According to various embodiments, a detection state shown in FIG. 3 corresponding to a 10 k ohm impedance indicates the media mode. Though a particular impedance level of 10 k ohm is discussed herein, different levels of impedance may be used in the device type indicator 1608 to associate an uncompressed media data signal from USB signals at an ID pin.

Media interface mechanism 1604 may be coupled to USB connector 120 by the first set of conductors 1606A and to media connector 124 by the second set of conductors 1606B. Media interface mechanism 1604 may include a controller 1610 coupled to a regulator 1612. In some embodiments, media interface mechanism 1604 may be included in the second sink device 110 rather than being included in the interface assembly 1600.

Regulator 1612 may be a voltage regulator for regulating 5V power received from a 5V pin of USB connector 120 when that connector is coupled to source device 102. The 5V power is regulated by regulator 1612 to supply power required for the controller 1610.

Controller 1610 may be a standalone device or be embedded in another device such as an application processor. USB connector 120 is also coupled to media interface mechanism 1604 to provide uncompressed high definition media or multimedia signals from source device 102 to controller 1610 when USB connector 120 is coupled to source device 102.

The uncompressed high definition media data may comprise at least one lane of media or multimedia data in accordance with a DisplayPort standard. Also, a two-way serial communication side-band channel is provided for setting up the lanes requirement and other communications on both sides. This channel may accommodate 3-wires (namely AUXP, AUXN and HPD) of communication into a single wire externally to both the devices on either side. In the example in FIG. 2, the side-band communication data is shown as a single C-wire signal that may be based on one or more of AUXP, AUXN, and HPD of the DisplayPort protocol. Internal to source device 102, the signals through the AUXP, AUXN, and HPD wires may be encoded as a single C-wire signal and electrically transmitted to the interface assembly 1600.

Controller 1610 may decode the encoded C-wire signal. The decoded signal may be converted as needed to provide side-band communication signals compatible with second sink device 110 when it is coupled to media connector 124.

An extra layer of protocol may be defined on top of a standard, such as a DisplayPort Standard, to accomplish the task of using 1 signal to have side-band communication data transmit or received over 1-pin of the USB Port of the source device. In source device 102, the AUXP, AUXN, and HPD side-band communication signals of the DisplayPort protocol may be provided to a layer of logic which encodes the information from the three signals onto the single C-wire signal in accordance with a C-wire protocol. The encoded signal, which may also be referred to herein as the transcoded signal, may be transmitted from source device 102 to interface assembly 1600 for decoding. Controller 1610 may decode the encoded signals based on the C-wire protocol to reconstruct the auxiliary channels signals (e.g., AUXP, AUXN, and possibly HPD).

If media connector 124 is a DisplayPort connector for connection to a sink device compatible with the DisplayPort media standard, interface assembly 1600 is operable to couple the three auxiliary channel signals to the sink device in accordance with the DisplayPort specification. Any handshaking information to be communicated back from the sink device to the source device is received by interface assembly 1600, encoded onto the C-wire signal and transmitted to the source device. For instance, interface assembly 1600 may communicate handshake information for link training, HPD detection, and High-bandwidth Digital Content Protection (HDCP), etc. between the source device and sink device as defined by the DisplayPort specification. In addition, extended display identification data (EDID) may be provided by the sink device to describe its display capabilities to the source device. Interface assembly 1600 may be operable to perform C-wire encoding of EDID in order to communicate it to the source device.

Media connector 124 may be compatible with other media or multimedia standards besides DisplayPort such as but not limited to a Digital Video Interactive (DVI) or a high definition multimedia interface (HDMI) standard. If media connector 124 is compatible with one of these other, non-DisplayPort, standards, controller 1610 may provide suitable signals to the media connector based on the DisplayPort standard signals received from the source device. That is, controller 1610 is operable to convert DisplayPort media data that may comprise lane(s) of uncompressed high definition media data along with serial communication side-band channel data received on the C-wire signal from the source device, such that media or multimedia signals and side-band communication signals in accordance with the other, non-DisplayPort, standard are communicated with the sink device.

Figure 17:
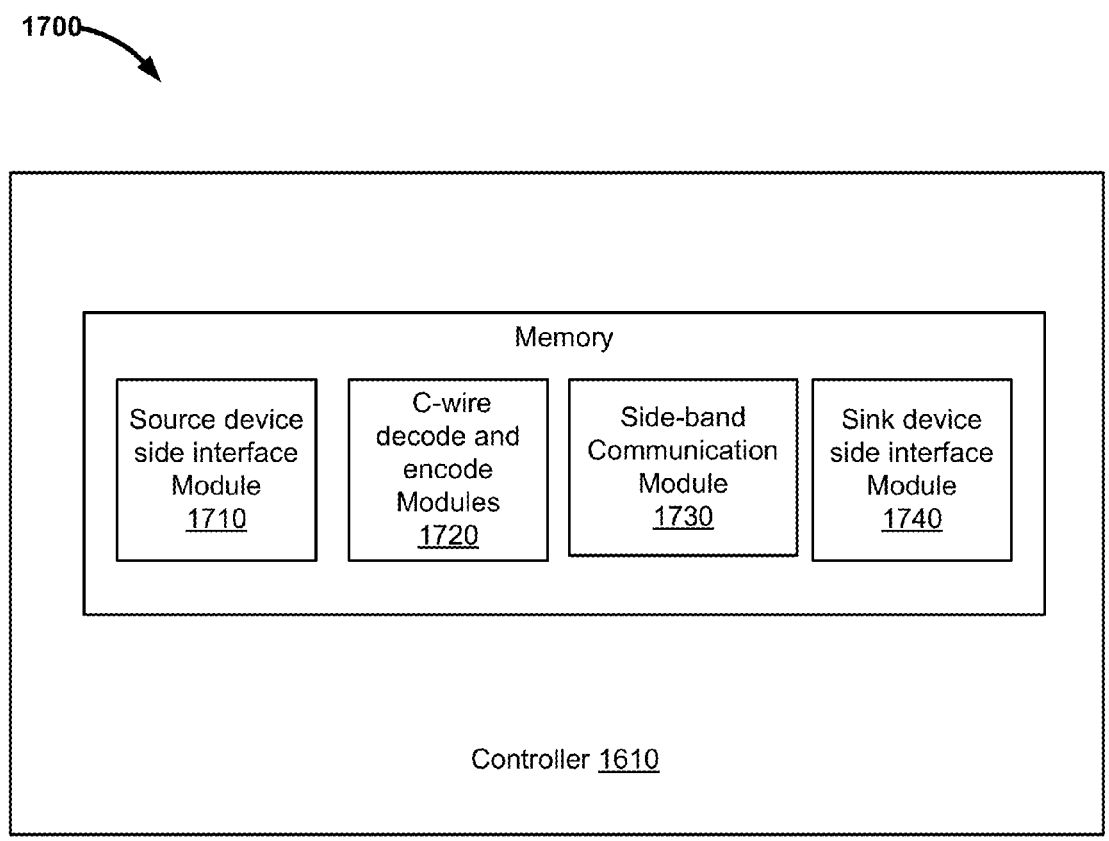
FIG. 17 illustrates an exemplary architecture of a system for the controller in FIG. 16.

FIG. 17 illustrates an exemplary architecture 1700 of a system for the controller 1610. The architecture 1700 may include a source device side interface module 1710, a C-wire decoding and encoding module 1720, a sideband communication module 1730, and a sink device side interface module 1740.

Alternative embodiments may comprise more, less, or functionally equivalent modules. Instructions may be retrieved and executed by a processor. Some examples of instructions include software, program code, and firmware. Instructions are generally operational when executed by the processor to direct the processor to operate in accord with certain embodiments. Although various modules may be configured to perform some or all of the various steps described herein, fewer or more modules may be provided and still fall within the scope of various embodiments.

Source device side interface module 1710 may provide the interface for the controller 1610 on the source device side. The source device side referring herein to a side that includes regulator 1612, device type indicator 1608 along with the USB connector 120 that is configured to plug into port 104 of source device 102. Uncompressed high definition media signals and a side-band communication signal may be received from the source device 102. The uncompressed high definition media signals may include at least one lane of data in accordance with a DisplayPort standard.

Controller 1610 may also receive DC power from the regulator 1612, as described further above. Once the required power is supplied by regulator 1612, controller 1610 may become operable. Source device side interface module 1710 may also receive and process an indication provided by device type indicator 1608 that may be coupled between media interface mechanism 1604 and connector 120. As described further above, device type indicator 1608 may include an impedance coupled between a conductor (of the electrical cable) 1606A and a reference potential, such that a voltage state indicative of a media mode is detectable at a respective one of the pins of the connector 120 when a current is provided to the respective pin.

Source device side interface module 1710 may provide for communicating side-band communications to and from the source device via a single side-band communication signal. The single signal may be encoded in accordance with a first protocol, also referred to herein as the C-wire protocol as will be described further below.

C-wire decoding and encoding module 1720 may provide decoding of the single signal (e.g., C-wire signal) supplied from source device 102 via connector 120 (e.g., USB connector 120). The single signal may be received at a single pin of USB connector 120 from a single pin of USB port 104 of source device 102 when the USB connector 120 is communicatively coupled to USB port 104. The decoding of the single signal may reconstruct (auxiliary) side-band communication signals with which the single signal was originally encoded. The auxiliary side-band communication signals originating at the source device 102 may be compatible with a DisplayPort standard.

C-wire decoding and encoding module 1720 may also provide encoding of side-band communication received from the sink device 110 into a single C-wire signal. The encoded C-wire signal may be provided to the source device 102 via USB connector 120. Side-band communication module 1730 may operate in conjunction with C-wire decode and encode module 1720 for processing side-band communication.

Sink device 110 may be compatible with a first media standard such as, but not limited to, the DisplayPort, high definition multimedia interface (HDMI), and Digital Video Interactive (DVI) standards. Controller 1610 may be operable to convert the side-band communication data received in the single signal into a plurality of signals in accordance with the first media standard. Sink device side interface module 1740 may be operable to supply the plurality of signals to media connector 124 via the electrical cable portion 1606B, such that the side-band communication data can be communicated to sink device 110 in accordance with its respective media standard.

The uncompressed high definition media signals supplied by source device 102 may include at least one lane of data in accordance with a DisplayPort standard. In that instance, if sink device 110 is compatible with a DisplayPort standard, controller 1610 (e.g., the sink device side interface module 1740) is operable to supply the at least one lane of data in accordance with a DisplayPort standard to media connector 124. Media port 112 of sink device 110 may be coupled to media connector 124. Sink device 110 may be configured for processing the at least one lane of data for presenting to a user.

On the other hand, if sink device 110 is compatible with another media standard (i.e., other than a DisplayPort standard), the at least one lane of data in accordance with a DisplayPort standard (e.g., received from source device 102) may be configured by controller 1610 in accordance with the other media standard and then supplied to media connector 124.

Sink device side interface module 1740 of controller 1610 may be operable to receive side-band communication data via media connector 124 (from sink device 110) and to configure the received side-band communication data to supply to USB connector 120. The configuring of the data received from sink device 110 may include converting the received data into a single signal (e.g., C-wire signal) that is coupled to USB connector 120. The conversion of the received data may include conversion by side-band communication module 1730, encoding by C-wire decode and encoding module 1720, and coupling by source device side interface module 1710.

Figure 18:
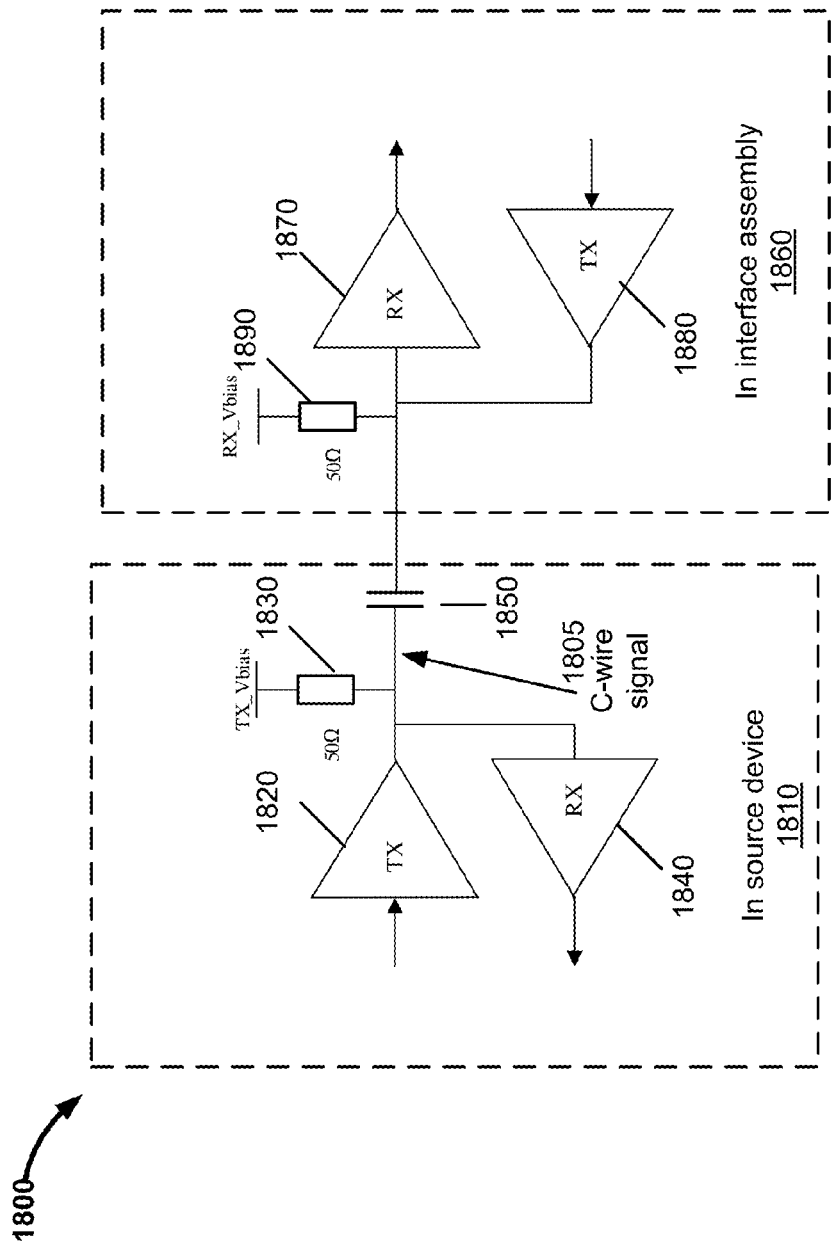
FIG. 18 is a block diagram illustrating various aspects of an exemplary single C-wire signal that may be used for communicating side-band communication.

FIG. 18 is a block diagram 1800 illustrating various aspects of an exemplary single signal (e.g., C-wire signal) that may be used for communicating side-band communication. The C-wire signal may be used for sending side-band communication data both to and from a source device (e.g., source device 102 in FIG. 1A). A circuit 1810 may include a transmitter TX 1820, a receiver RX 1840, an exemplary 50 ohm impedance 1830, a capacitor 1850, and a bias voltage identified as TX_Vbias. The output of transmitter TX 1820 and the input to receiver RX 1840 may be joined at a junction, the signal from the junction being identified as a C-wire signal 1805 in FIG. 18. C-wire signal 1805 may be transmitted by transmitter TX 1820 or received by receiver RX 1840 on the single signal line. The impedance 1830 is coupled between the TX_Vbias and the C-wire signal 1805 to provide signal pull-up. C-wire signal 1805 may be coupled to a circuit 1860 in interface assembly 1600 via the capacitor 1850 when source device 102 is coupled to interface assembly 1600.

Circuit 1860 includes a receiver RX 1870, transmitter TX 1880, exemplary 50 ohm impedance 1890, and a bias voltage identified as RX_Vbias. C-wire signal 1805 may be transmitted from source device 102 to receiver RX 1870 in interface assembly 1600. C-wire signal 1805 may be transmitted from transmitter TX 1880 in interface assembly 1600 to receiver RX 1840 in source device 102. The output of transmitter TX 1880 and the input to receiver RX 1870 may be joined at a junction which is coupled to the impedance 1890 that provides signal pull-up. Thus, a single C-wire signal may be transmitted or received to/from source device 102 and may be transmitted or received to/from interface assembly 1600.

Figure 19:
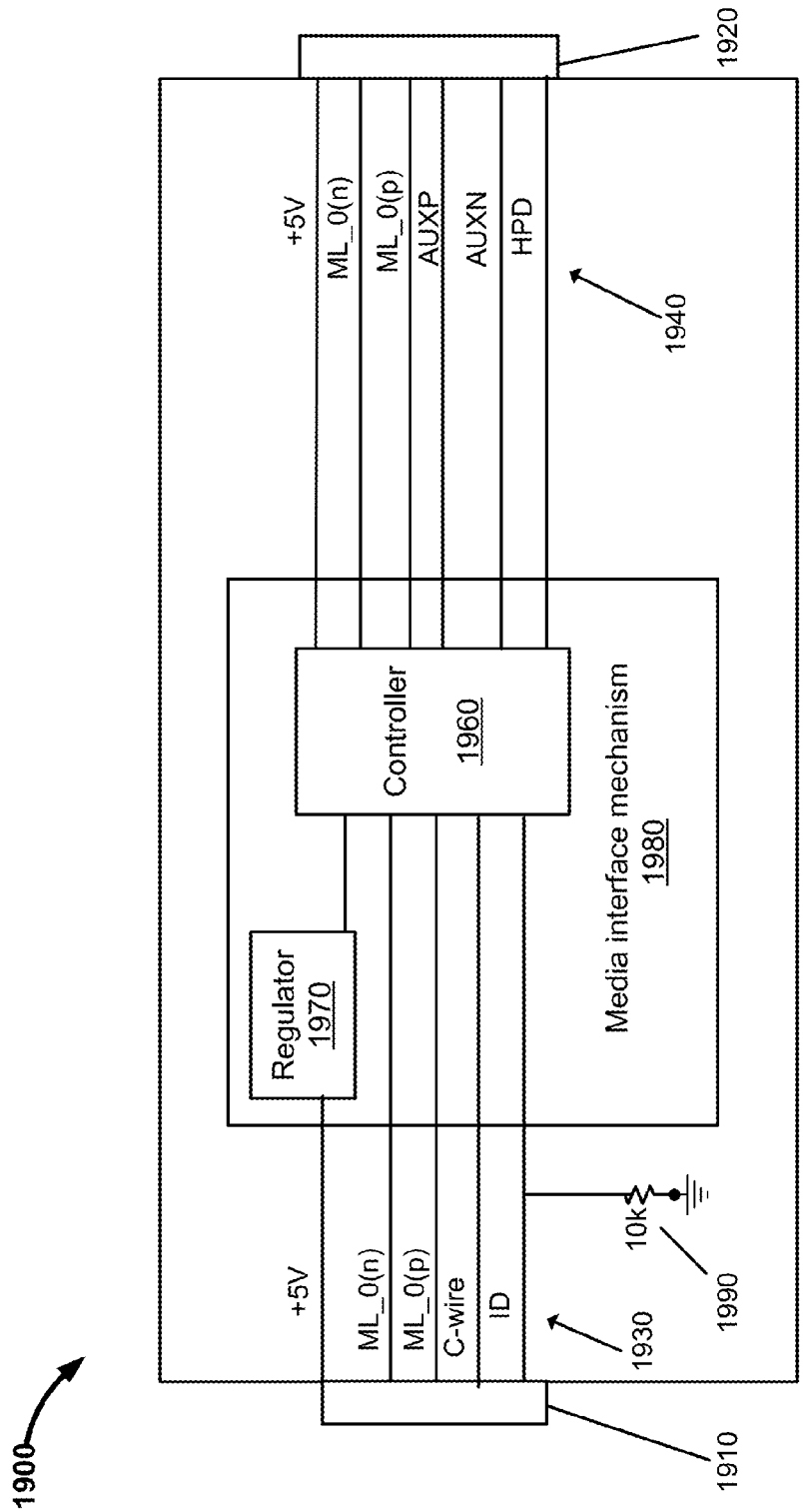
FIG. 19 is an exemplary interface assembly to implement the interface assembly of FIG. 16.

FIG. 19 is an exemplary interface assembly 1900 to implement the interface assembly 1600 of FIG. 16. Interface assembly 1900 may couple a DisplayPort compatible source device to a sink device having a DisplayPort compatible port. Interface assembly 1900 includes a USB connector 1910, a media interface mechanism 1980 coupled between a first cable portion 1930 and a second cable portion 1940, a device type indicator 1990, and a media connector 1920. The first cable portion 1930 may include a plurality of conductors for carrying a +5V signal, a C-wire signal, and an ID signal respectively. Conductors may also be included for carrying at least one lane of uncompressed high resolution media data in accordance with a DisplayPort media standard (see e.g., one lane identified as ML-0($n$), and ML-0($p$)). Although one lane is shown in FIG. 19 for a USB 2.0 connector 1910 of the interface assembly 1900, multiple lanes may be used (e.g., if a USB 3.0 connector is used). The corresponding source device USB port may provide multiple lanes in FIGS. 2-5 for a USB 3.0 port, and a single lane in FIGS. 6-11 for a USB 2.0 port. The USB connector 1910 includes corresponding pins having ends to which the conductors 1930 may be coupled. The C-wire signal is for providing a single signal for carrying side-band communication to and from the USB connector 1910.

Device type indicator 1990 may include a 10 k ohm impedance coupled between the conductor for the ID signal (at the ID pin) and a reference potential. Other suitable impedances may be used. A high definition (HD) uncompressed media data signal may be indicated at the ID pin. For example, the uncompressed media data signal may have a detection state associated with an impedance other than that for a USB detection state and distinguishable from any USB detection state. Examples of such an impedance include 20 k ohm, 15 k ohm, 10 k ohm, 5 k ohm, or some other level of impedance. Though a particular impedance level of 10 k ohm may be discussed herein and shown in FIG. 19, different levels of impedance may be used to differentiate an uncompressed media data signal from USB signals at an ID pin. According to various embodiments, a detection state shown in FIG. 3 corresponding to a 10 k ohm impedance indicates compatibility with a HD uncompressed media data signal cable, i.e., a media mode. Responsive to the indication of the media mode, the micro-controller 206 of selection circuit 212 in the source device may generate a selection signal 216 to cause the switch 210 to selectively couple the DisplayPort transmitter 604 to the USB port 208 (See FIG. 4).

Media interface mechanism 1980, controller 1960, and regulator 1970 may implement, respectively, media interface mechanism 1604, controller 1610, and regulator 1612, of FIG. 16. In the example in FIG. 19, media connector 1920 of the interface assembly 1900 may be coupled to a sink device that is compatible with a DisplayPort standard. The second cable portion 1940 may include a plurality of conductors separately carrying a +5V signal, the ML-0($n$), and ML-0($p$) signals for the at least one lane of uncompressed high resolution DisplayPort data, along with the AUXP, AUXN, and HPD side-band communication signals. The media connector 1920 includes corresponding pins having ends to which the conductors may be coupled.

In the example in FIG. 19, media connector 1920 is a DisplayPort connector for connection to a sink device that is DisplayPort compatible. Interface assembly 1900 is operable to couple the three auxiliary side-band communication signals (AUXP, AUXN, and HPD) to sink device 110 via media connector 1920 in accordance with the DisplayPort specification. Media interface mechanism 1980 may be supplied with the C-wire signal and may be operable to reconstruct the AUXP, AUXN, and HPD side-band communication signals from the supplied C-wire signal Any handshaking information to be communicated from sink device 110 on the AUXP, AUXN and HPD signals may be received by interface assembly 1900, encoded onto the C-wire signal and transmitted to source device 102 via USB connector 1910. The sink device 110 may be configured for processing the at least one lane of data for presenting to a user.

Figure 20:
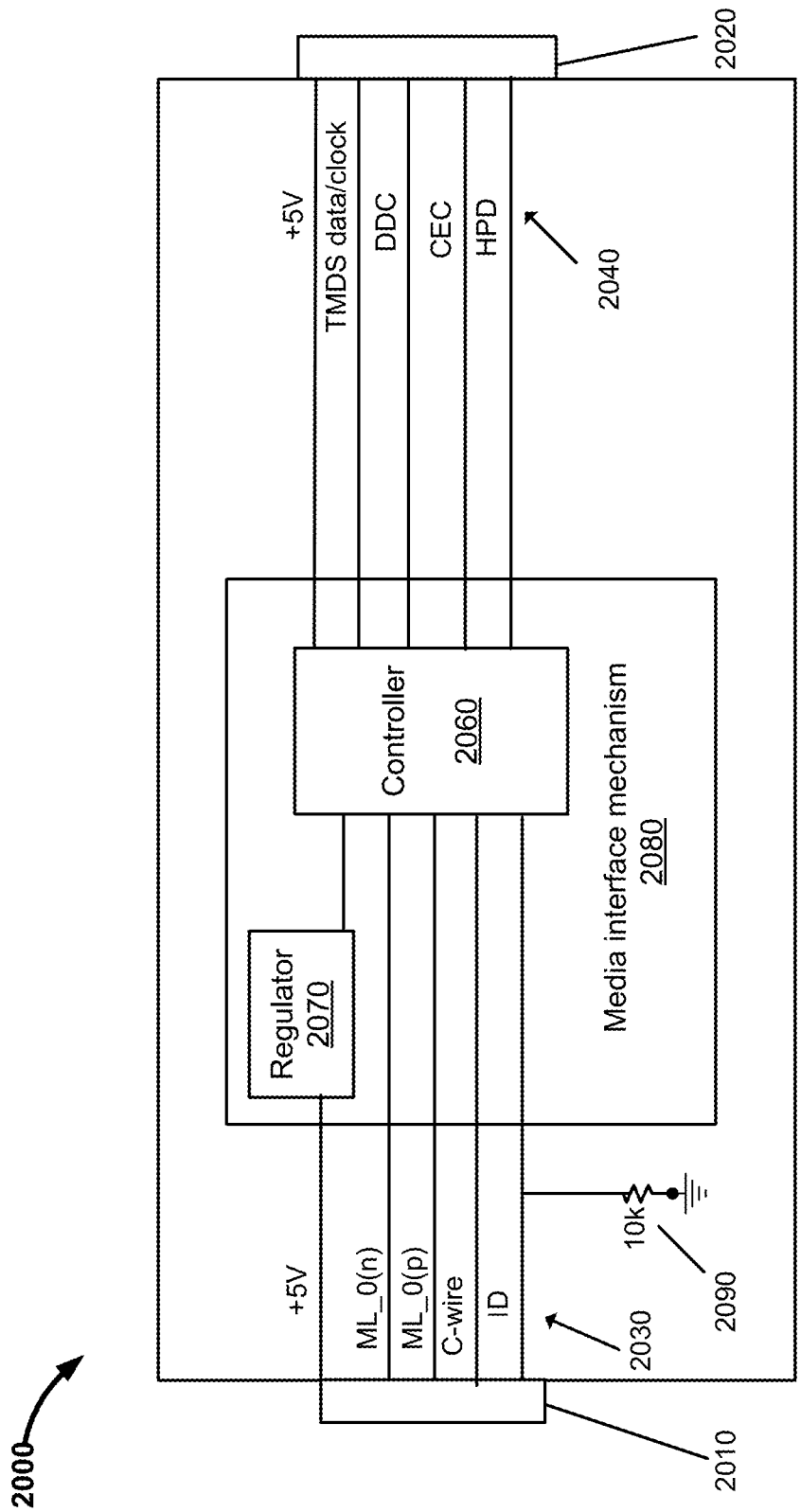
FIG. 20 is another exemplary interface assembly to implement the interface assembly of FIG. 16.

FIG. 20 is another exemplary interface assembly 2000 to implement the interface assembly of FIG. 16. The exemplary interface assembly 2000 may couple a DisplayPort compatible source device to a sink device having an HDMI compatible port. Although interface assembly 2000 is shown for HDMI in FIG. 20, other media standards port may be implemented. Interface assembly 2000 may include a USB connector 2010, a media interface mechanism 2080 coupled between a first cable portion 2030 and a second cable portion 2040, a media connector 2020, and a device type indicator 2090. Media connector 2020 is an HDMI connector in this example, i.e., not a DisplayPort connector.

First cable portion 2030 may include a plurality of conductors separately carrying a +5V signal, a C-wire signal for side-band communication, an ID signal, at least one lane of uncompressed high resolution media data in accordance with a DisplayPort media standard, ML-0($n$), and ML-0($p$). In some embodiments, a USB 3.0 connector may be used to supply multiple lanes of uncompressed high resolution media data to an interface assembly. The USB connector includes corresponding pins having ends to which the conductors may be coupled.

Device type indicator 2090 may include a 10$k$ ohm impedance coupled between the conductor for the ID signal (at the ID pin) and a reference potential. Other suitable impedances may be used. A high definition (HD) uncompressed media data signal may be indicated at the ID pin. For example, the uncompressed media data signal may have a detection state associated with an impedance other than that for a USB detection state and distinguishable from any USB detection state. Examples of such an impedance include 20 k ohm, 15 k ohm, 10 k ohm, 5 k ohm, or some other level of impedance. Though a particular impedance level of 10 k ohm may be discussed herein and shown in FIG. 20, different levels of impedance may be used to differentiate an uncompressed media data signal from USB signals at an ID pin. According to various embodiments, a detection state shown in FIG. 3 corresponding to a 10 k ohm impedance indicates compatibility with a HD uncompressed media data signal cable, i.e., a media mode.

Media interface mechanism 2080, controller 2060, and regulator 2070 may implement, respectively, media interface mechanism 1604, controller 1610, and regulator 1612 of FIG. 16. In the example in FIG. 20, media connector 2020 of the interface assembly 2000 may be coupled to a sink device that is compatible with an HDMI media standard. Second cable portion 2040 may include a plurality of conductors separately carrying a +5V signal, Transition Minimized Differential Signaling (TMDS) data/clock signal, along with the Display Data Channel (DDC), Consumer Electronics Control (CEC) and Hot Plug Detect (HPD) signals in accordance with the HDMI standard.

Since the HDMI standard for the media connector 2020 is other than a DisplayPort standard, the at least one lane of received (DisplayPort) data (ML_0($n$), ML_0($p$)) is configured by the controller 2060 before being supplied to the media connector 2020 (i.e., configured in accordance with the HDMI standard).

Controller 2060 is further operable to convert the side-band communication data received in the C-wire signal from USB connector 2010 into a plurality of signals in accordance with the HDMI standard (e.g., DDC, CEC, HPD). The plurality of side-band communication signals are coupled to media connector 2020 from controller 2060 by the second cable portion 2040, such that the side-band communication data can be communicated to an HDMI compatible sink device via the HDMI connector 2020.

Controller 2060 may be operable to receive side-band communication data via the HDMI media connector 2020 from an HDMI compatible sink device. Controller 2060 is further operable to configure the received side-band communication data to supply to USB connector 2010. The configuring of the side-band communication data by the controller 2060 may include converting the received side-band communication signals (e.g. DDC, CEC, HPD) into a single signal (e.g., C-wire signal) and coupling it to USB connector 2010. The conversion includes encoding the single C-wire signal for supplying to USB connector 2010 and processing any required responses to the side-band communications from the sink device via media connector 2020.

Controller 2060 is operable to detect that a source device (e.g., source device 102 in FIG. 1A) is coupled to USB connector 2010 and that a sink device (e.g., sink device 110 in FIG. 1A) is coupled to media connector 2020. Regulator 2070 is operable to regulate the +5V input supplied by the source device to provide suitable power required by the controller 2060.

Figure 21:
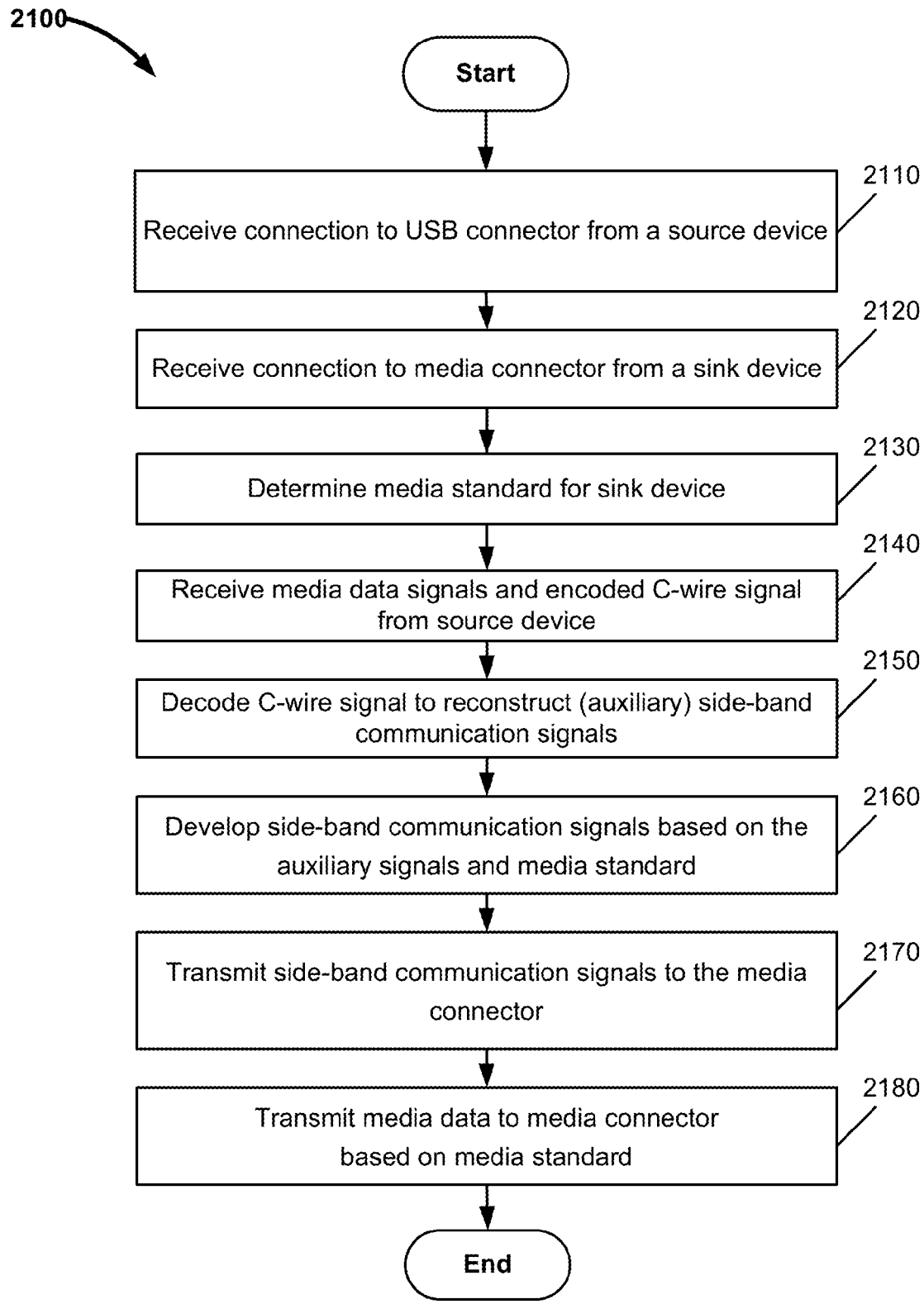
FIG. 21 is a flow chart of an exemplary method for transferring data.

FIG. 21 is a flow chart of an exemplary method 2100 for transferring data. Method 2100 may be for transferring data to the media connector of the interface assembly (see e.g., media connector 124 in FIG. 16, DisplayPort standard connector 1920 in FIG. 19, and HDMI standard connector 2020 in FIG. 20). A connection to the USB connector (see e.g. connector 120 in FIG. 16) is received from a source device at step 2110. The connection may be from a USB port of a source device (see e.g. source device 102 in FIG. 1A). A connection to the media connector is received from a sink device at step 2120. The connection may be from a media port of a sink device (see e.g. sink device 110 in FIG. 1A). A determination is made of the media standard for the sink device at step 2130. The media standard may be predetermined by the type of media connector in the interface assembly. Media data signals and an encoded C-wire signal may be received from the source device at step 2140. At step 2150, the C-wire signal may be decoded to reconstruct the (auxiliary) side-band communication signals (e.g., signals AUXP, AUXN, HPD). Side-band communication signals are developed based on the auxiliary signals and the media standard, at step 2160. The side-band communication signals are transmitted to the media connector at step 2170. At step 2180, media data is transmitted to the media connector based on media standard.

Figure 22:
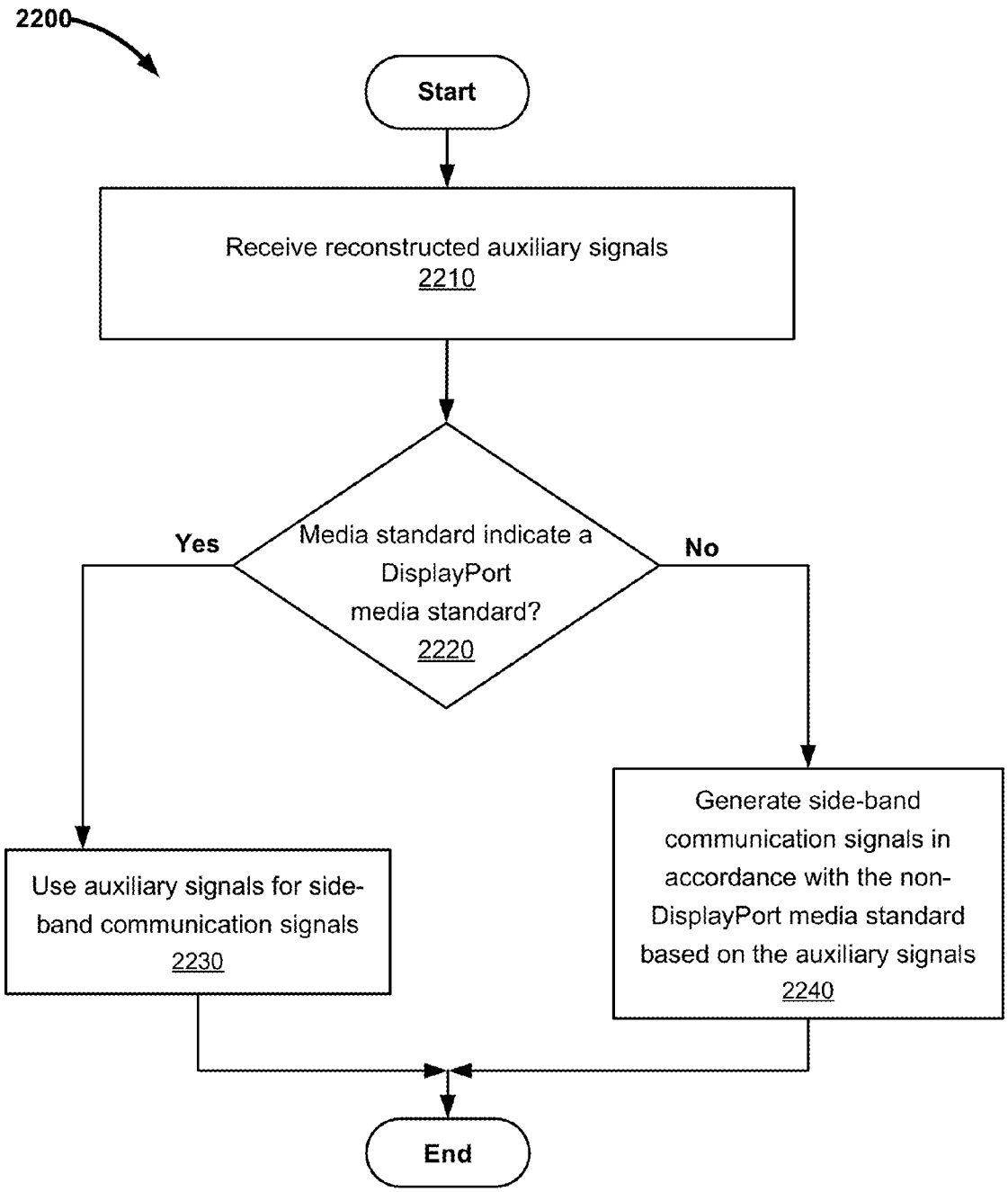
FIG. 22 is a flow chart of an exemplary method for developing side-band communication signals based on the auxiliary signals and the media standard.

FIG. 22 is a flow chart of an exemplary method 2200 for developing side-band communication signals based on the auxiliary signals and the media standard. The reconstructed auxiliary signals are received at step 2210. A determination is made at step 2220 whether the media standard indicates a DisplayPort media standard. The media standard may be determined by the media standard for the media connector of the interface assembly (see e.g., connector 124 in FIG. 16, DisplayPort standard connector 1920 in FIG. 19, and HDMI standard connector 2020 in FIG. 20). If the media standard indicates a DisplayPort standard, the auxiliary signals are used for the side-band communication signals at step 2230. If the media standard indicates a standard that is not a DisplayPort standard, the side-band communication signals are generated at step 2240 (e.g., by the controller 1610 in FIG. 16) in accordance with the non-DisplayPort media standard based on the auxiliary signals.

Figure 23:
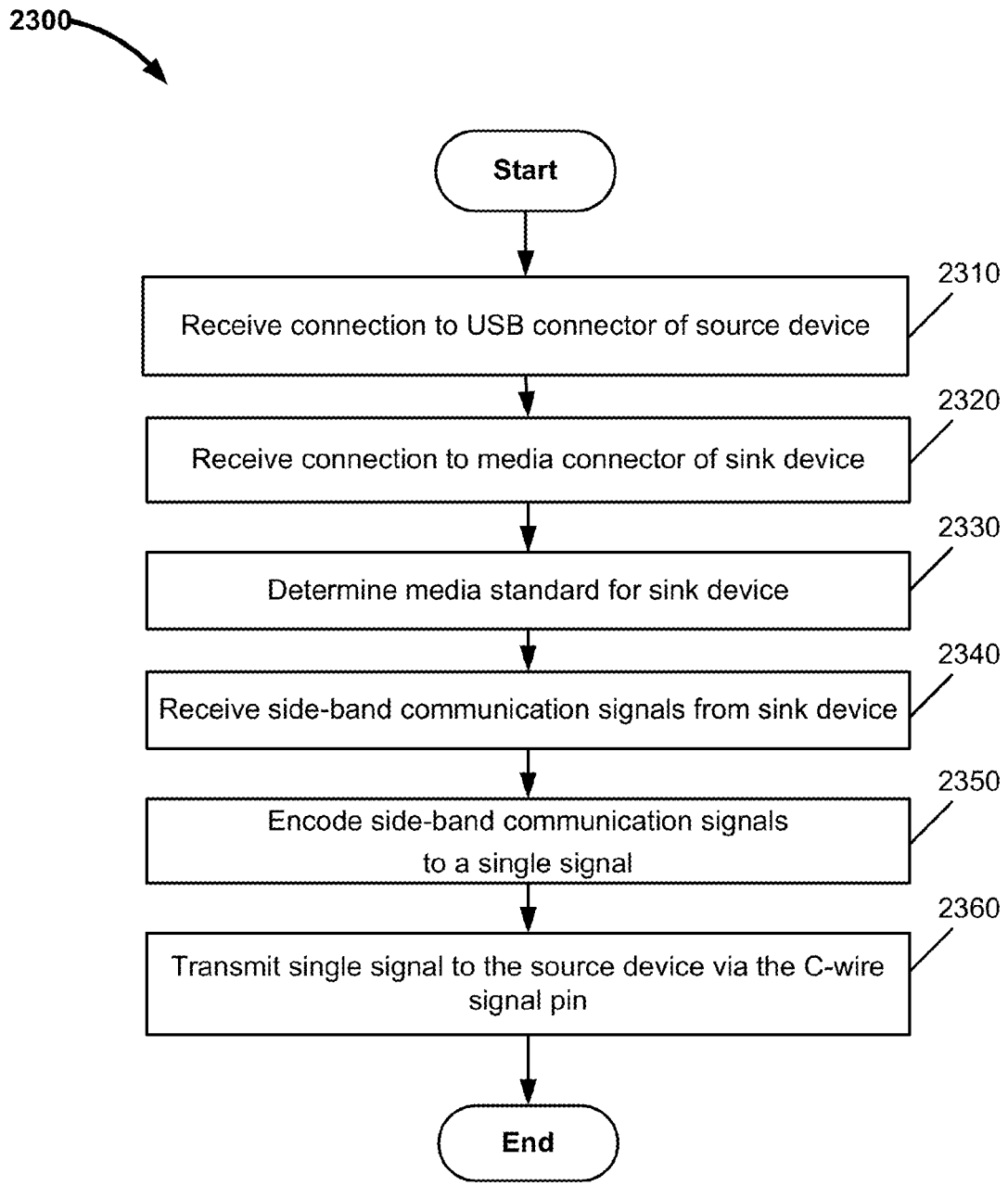
FIG. 23 is a flow chart of an exemplary method for transferring data.

FIG. 23 is a flow chart of an exemplary method 2300 for transferring data. The exemplary method 2300 may be for transferring side-band communication data to the USB connector of the interface assembly (see e.g., USB connector 120 of interface assembly 1600 in FIG. 16, USB connector 1910 of interface assembly 1900 in FIG. 19, and USB connector 2010 of interface assembly 2000 in FIG. 20). A connection to a USB connector of a source device is received at step 2310. A connection to a media connector of a sink device is received at step 2320. A determination is made of the media standard for the sink device at step 2330. The media standard may be determined by the media standard for the media connector of the interface assembly. Side-band communication signals are received from the sink device at step 2340. The side-band communication signals are encoded onto a single signal (e.g., the C-wire signal in FIG. 16) at step 2350. The single signal is transmitted to the source device via the C-wire signal pin of the USB connector at step 2360 (see e.g., connector 1910 in FIG. 19 and connector 2010 in FIG. 20).

In exemplary embodiments, a single wire (e.g. a Micro or Mini USB ID pin) to communicate side-band information between transmitter devices and receiver devices. As stated above, this single wire may be named C-wire. The C-wire may be a relatively low-speed (e.g., 1 Mbps, 2 Mbps, or any suitable speed) half-duplex bi-directional single-end link. See FIG. 18 for an exemplary embodiment of an exemplary single signal (e.g., C-wire signal) that may be used for communicating side-band communication.

Figures 31, 32, 33:
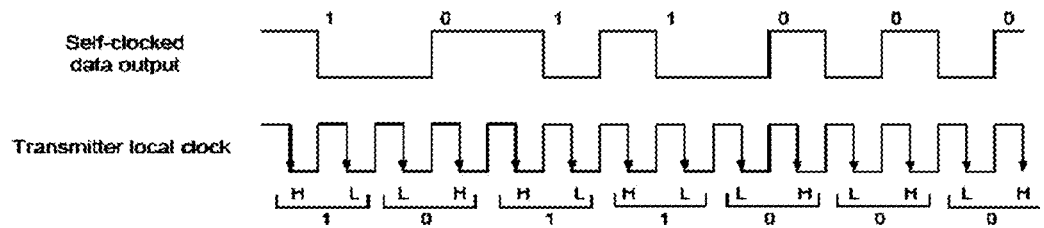
FIG. 31 is a timing diagram illustrating an exemplary C-wire that performs self-clocked transmission of signals.
FIG. 32 illustrates an exemplary data format of a request transaction.
FIG. 33 illustrates an exemplary data format of a reply transaction.

The C-wire may, in some embodiments, utilize Manchester-II code for the self-clocked transmission of signals as shown in FIG. 31.

An exemplary data format of a request transaction may be represented as shown in FIG. 32.

An exemplary reply transaction may take the form shown in FIG. 33.

At a pre-charge state, 10 to 16 consecutive 0's in Manchester II code may pre-charge a C-wire line.

At an exemplary Sync Pattern state, the transaction may commence with 16 consecutive 0's in Manchester II code. At the end of the exemplary Sync Pattern, the C-wire may be driven high for a two-bit period and low for a two-bit period. Such an operation is illegal in some embodiments of Manchester II code.

The Request Command may take one of the forms shown below in Table 6:

TABLE 6

| COMM[3] | COMM[2] | COMM[1] | COMM[0] |
|---|---|---|---|
| 1: DisplayPort transaction | 000: Request type is write 001: Request type is read others: Reserved | | |
| 0: I2C transaction | 11: MOT (Middle-of-Transaction) = 1 10: MOT (Middle-of-Transaction) = 0 | 00: write 01: read 00: write_status_request 01: Reserved | |

The Reply Command may take the one of the forms shown below in Table 7:

TABLE 7

| COMM[3] | COMM[2] | COMM[1] | COMM[0] |
|---|---|---|---|
| I²C-over-AUX Reply field: 00: I²C_ACK. 01: I²C_NACK. 10: I²C_DEFER. 11: Reserved. | | Native Reply field: 00: ACK. 01: NACK. 10: DEFER. 11: Reserved. | |

At an exemplary "Stop" state, the C-wire line 2640 may be driven too high for a two bit period and low for a two bit period, which is illegal in Manchester II code.

The functions of the C-wire may include plugged device type identification, where a host device (see e.g. Host 2610 in FIG. 26) may use the C-wire to identify the receiver device (see e.g. Sink/repeater 2620 in FIG. 26) or if a traditional mobile device USB accessory may be plugged in. The C-wire may also be used for HPD Detection, where a host device can get HPD information of downstream receiver (or sink) device, which may utilize any of a DisplayPort, an HDMI, a DVI, and/or a VGA converter device. The C-wire may also be used for DPCD reading, where the host device may read DPCD of a repeater/converter with the C-wire.

Figure 24:
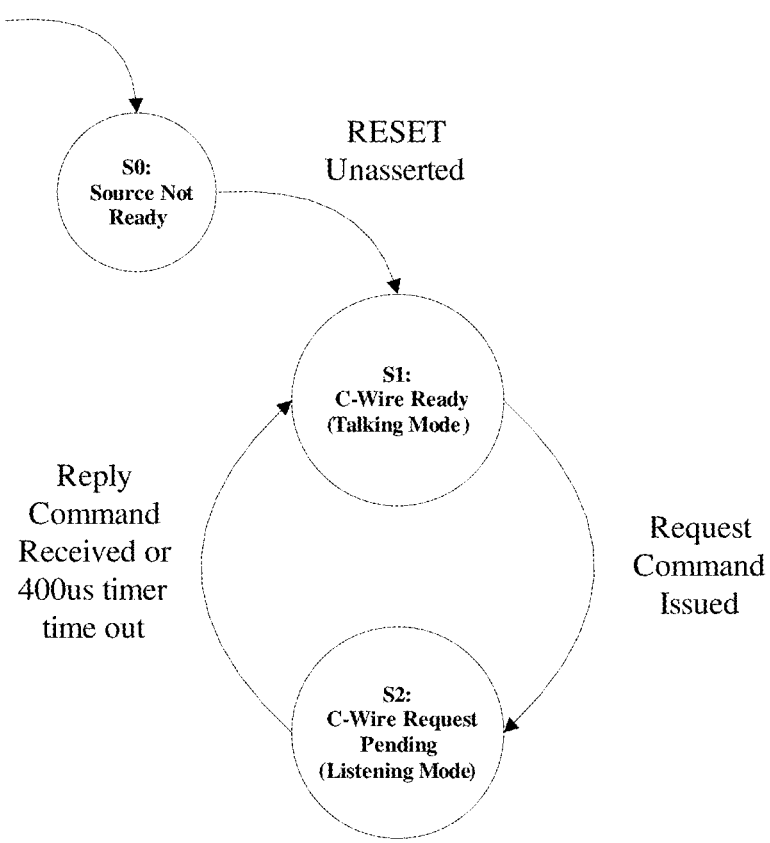
FIG. 24 is a state diagram of an exemplary C-wire source device.
Figure 25:
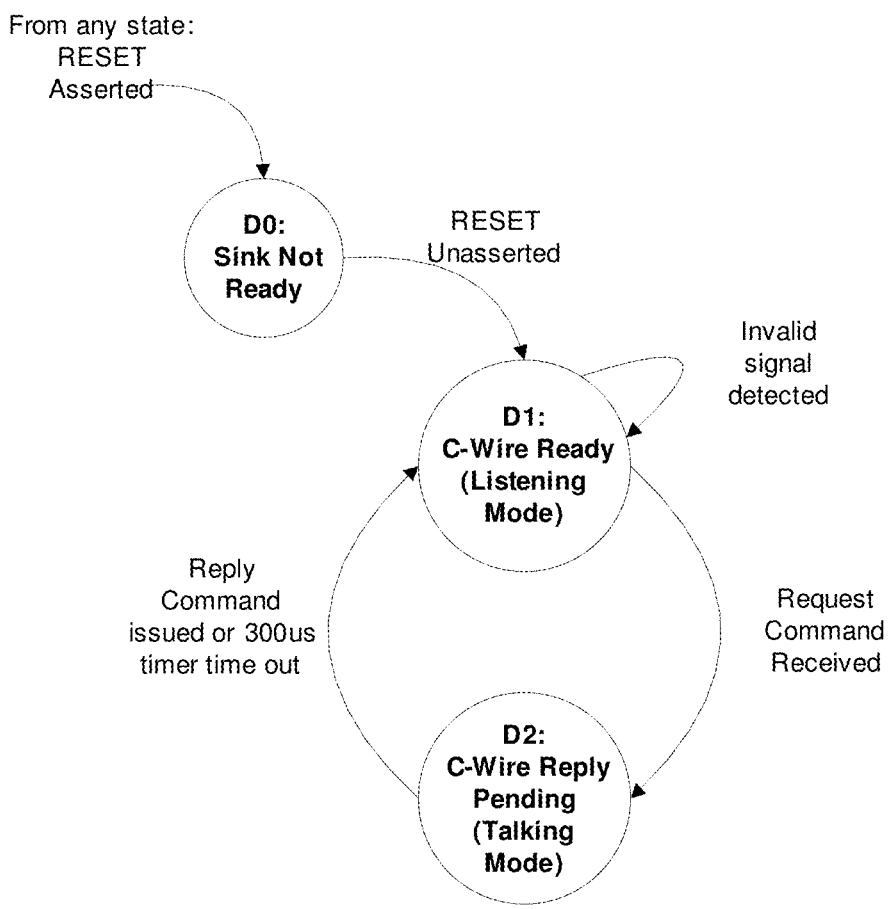
FIG. 25 is a state diagram of an exemplary C-wire sink device.

The C-wire may also be used for configuration registers access, where the host device may read and write to a configuration register of a receiver (or sink) device. Furthermore, EDID reading may be performed, where a host device may read EDID of any of a DisplayPort, an HDMI, a DVI, and/or a VGA sink device. In some embodiments, link training, where a host device performs link training of DP link with repeater/converter device, may be performed using the C-Wire. Additionally, DCP authentication, wherein a host device performs HDCP authentication with one or more downstream receiver devices, may be performed using a C-wire. CEC Support may also, in some embodiments, be provided by the C-wire. A host device may send one or more CEC commands with access configuration register over the C-wire. If a CEC command is received by a compatible repeater/converter through sink devices, the repeater/converter will notify the host device with a vendor specific interrupt. These and other examples of the functionality provided by the C-wire are shown in FIGS. 24 and 25.

Figure 26:
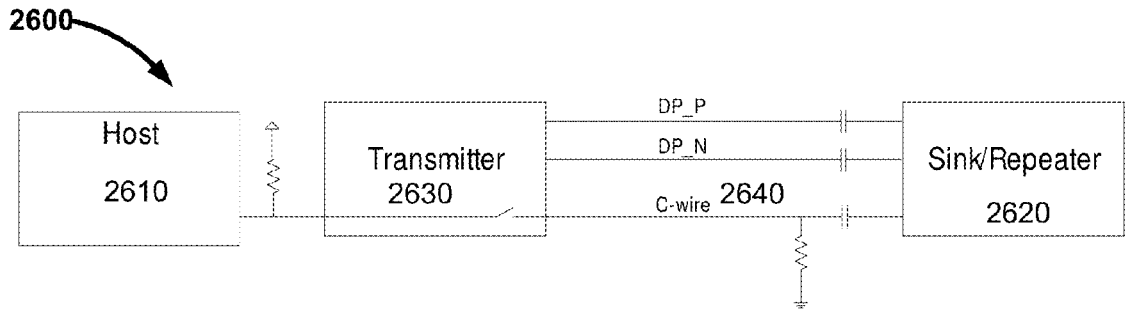
FIG. 26 is a block diagram of an exemplary interface assembly.

As stated above, plugged device type identification may be performed using the C-wire. As shown in FIG. 26, the mobile system could detect sink/repeater/converter chip plug-in through an ID pin (defined in Micro-USB) pull-down resistance. The resistance value may be defined by system requirement in various embodiments. The plugged device type identification is described below, with regard to the downstream device detect, in further detail.

When a host device 2610 detects that the repeater/converter device 2620 (also referred to herein as the sink/repeater) is plugged in, it may initialize the DPCD read operation of the downstream device (e.g., transmitter 2630) via the C-wire 2640. If the DPCD read operation is successful, then the transmitter 2630 is self-powered and ready to operate. Otherwise the host device 2610 may send power through SP_PWR pin to the repeater/converter device 2620. Then the host device 2610 may read the DPCD of the repeater/converter device 2620 again. In this example, if a correct reply is received by the host device 2610, it is confirmed that a compatible sink/repeater/converter device 2620 is plugged in. If the DPCD read operation fails, the host device 2610 will go back to the device detection state, in this example.

Figure 27:
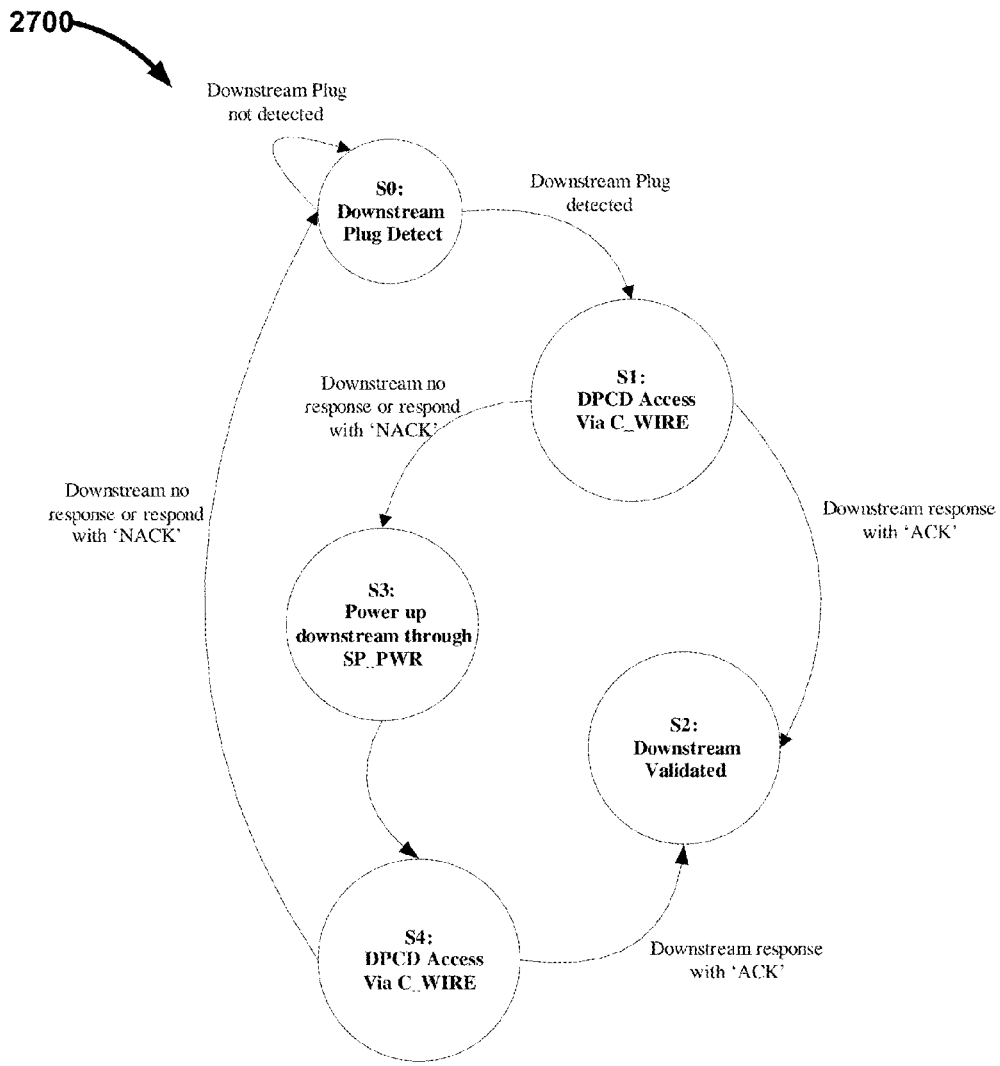
FIG. 27 is a state diagram of an exemplary interface assembly detecting a downstream device.

The above downstream device detection scheme is described in FIG. 27.

Figure 28:
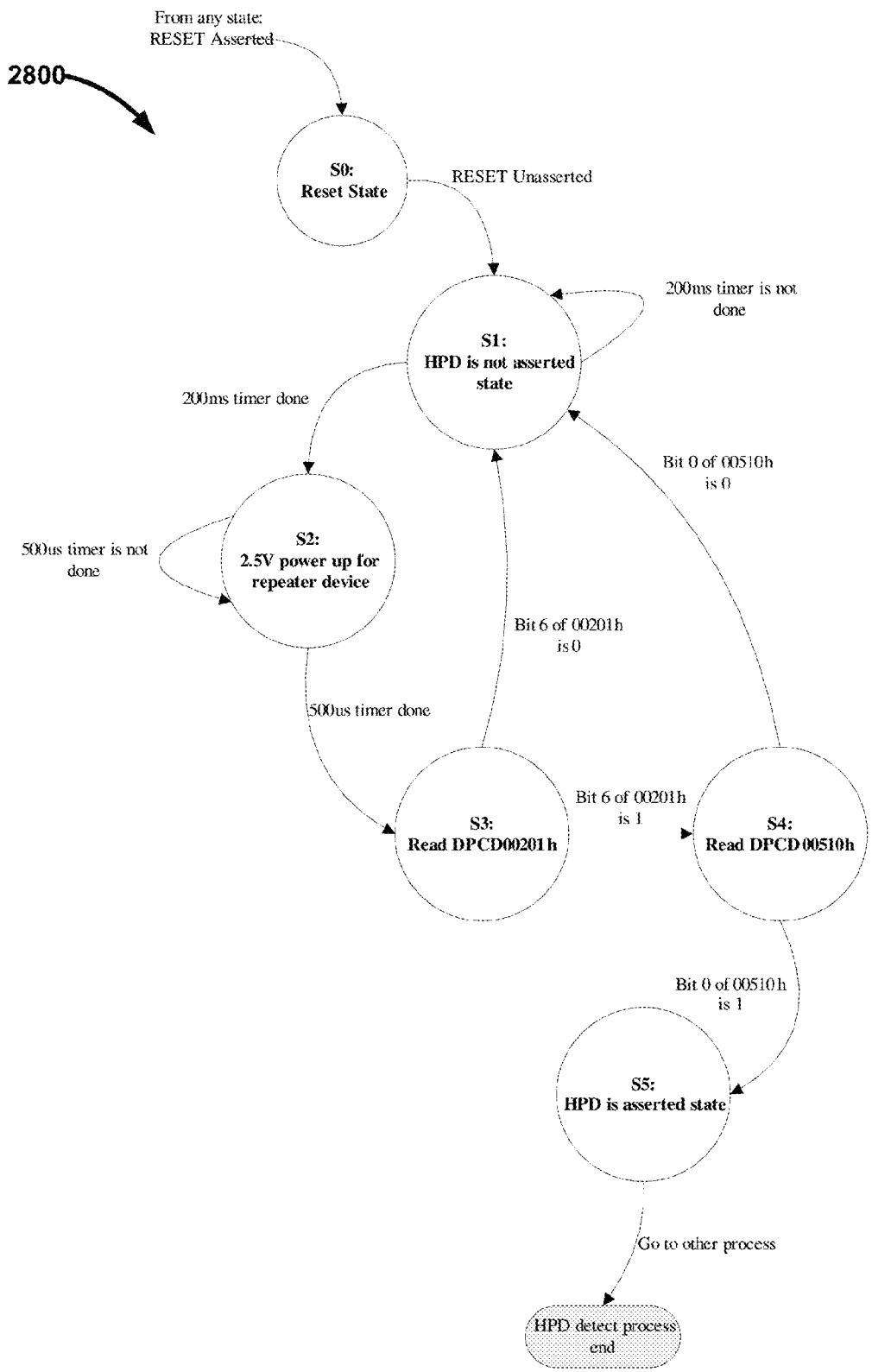
FIG. 28 is a state diagram of an exemplary interface assembly detecting a hot-plug-detect (HPD) device.

In various embodiments, after the repeater/converter 2620 device is identified, an upstream device will be polling DPCD DEVICE_SERVICE_IRQ_VECTOR (00201h) of the repeater/converter 2620 within 200 ms, also known as the "heartbeat function." An embodiment of the heartbeat function is described in FIG. 28. If the host device 2610 detects bit 6 (SINK_SPECIFIC_IRQ) of DEVICE_SERVICE_IRQ_VECTOR is 1, host device 2610 will read DPCD 00510h to identify which kind of device service interrupt is asserted. If bit 0 of DPCD 00510 is 1, that means downstream device is plugged. Otherwise the downstream device is unplugged. How the repeater/converter 2620 detects downstream device plug/unplug may be implementation specific in some embodiments.

The C-wire may provide additional functionality in some embodiments. The host device 2610 may use the C-wire 2640 to read or write DPCD of the repeater/converter 2620 with same mechanism defined in a DisplayPort standard specification. The host device 2610 may fully control all of configuration register of Repeater/converter with DPCD read/write using the C-wire 2640. The host device 2610 may also use the C-wire 2640 to read EDID with same mechanism defined in a DisplayPort standard specification.

The host device 2610 may use the C-wire 2640 to read and write to a sink device internal register. The sink internal register block may include a plurality of blocks, where each block may contain a 256-byte configuration register. Different commands to the sink device internal register are described below in Tables 8.1-8.3:

TABLE 8.1

SINK_DEV_SEL, DisplayPort Address: 0x005f0

| Bit Name | Type | Def. value | Description |
|---|---|---|---|
| 7:4 Reserved | R/O | 0x0 | |
| 3:0 SINK_DEV_SEL | R/W | 0x0 | Select which block of sink internal register will be accessed. |

TABLE 8.2

SINK_ACCESS_OFFSET, DisplayPort Address: 0x005f1

| Bit | Name | Type | Def. value | Description |
|---|---|---|---|---|
| 7:0 | SINK_ACCESS_OFFSET | R/W | 0x0 | This register gives the offset (register address) for accessing the internal registers defined in chip spec. |

TABLE 8.3

SINK_ACCESS_REG, DisplayPort Address: 0x005f2

| Bit | Name | Type | Def. value | Description |
|---|---|---|---|---|
| 7:0 | SINK_ACCESS_REG | R/W | 0x0 | This register is the content mapping with the internal registers. |

For example, if host device 2610 wants to read configuration register block #7 and the offset is 0x01, the host device 2610 may:

Write 0x07 to DPCD 005F0h using C-wire.
Write 0x01 to DPCD 005F1h using C-wire.
Read the content of block #7:0x01 from DPCD 005f2h.

Additionally, in an exemplary embodiment, if host device 2610 wants to read configuration register block #1 and the offset is 0x50 with 0xFF, the host device 2610 may:

Write 0x01 to DPCD 005F0h using C-wire.
Write 0x50 to DPCD 005F1h using C-wire.
Write 0xFF to DPCD 005f2h, the data 0xFF will be written to block #1:0x50.

In further embodiments, host device 2610 may perform link training using the C-wire 2640 to transfer hand shake information as defined in a DisplayPort standard specification. When repeater/converter device 2620 detects the main link has lost synchronization, the repeater/converter device 2620 may set bit 6 of DPCD 00201h and bit 2 of DPCD 00510h to notify the link status to the host device 2610. The host device 2610 may be, in some embodiments, polling 00201 within 200 ms intervals. When the host device 2610 detects the link fail interrupt, the host device 2610 may be configured to re-perform link training to recover the main link.

In some embodiments, the host device 2610 may perform downstream HDCP authentication with the C-wire 2640 to transfer the hand shake information as defined in a DisplayPort standard specification. When HDCP authentication is performed, the repeater/converter device 2620 may set bit 6 of DPCD 00201h and bit 3 of DPCD 00510h to notify the host device 2610 that the authentication has been performed. Meanwhile, Bit 4 of DPCD 00510h may indicate the result of the HDCP authentication process. If Bit 4 is asserted with Bit 3 is 1 of DPCD 00510h, it is indicated that the HDCP authentication failed. However, if Bit 4 is 0, the HDCP authentication was successful. If the repeater/converter 2620 detects that HDCP link integrity check has failed, the repeater/converter 2620 may set Bit 6 of DPCD 00210h and Bit 5 of DPCD 00510h to notify host device 2610 about the event.

CEC may be supported over the C-wire 2640 in some embodiments. The commands sent from the sink device may be transferred to the source devices through a C-wire channel. The DPCD registers relative with CEC function are listed below, in Tables 9.1-9.4:

TABLE 9.1

CEC Control Register, DisplayPort Address: 0x00570

| Bit(s) | Name | Type | Default | Description |
|---|---|---|---|---|
| 7:4 | CEC_LADDR | R/W | 0x0 | CEC receiver logical address |
| 3 | CEC_RX_EN | R/W | 0x0 | CEC receiver enables. 1: enable; 0: disable |
| 2 | CEC_TX_ST | R/W S/C | 0x0 | CEC sending start |
| 1 | Reserved | | | |
| 0 | CEC_RESET | R/W S/C | 0x0 | CEC reset |

TABLE 9.2

CEC Rx Status Register, DisplayPort Address: 0x00571

| Bit(s) | Name | Type | Default | Description |
|---|---|---|---|---|
| 7 | CEC_RX_BUSY | R/O | 0x0 | CEC Rx busy. 1: receiver busy; 0: receiver idle |
| 6 | Reserved | | | |
| 5 | CEC_RX_FUL | R/O | 0x0 | CEC Rx FIFO full indicator. 1: FIFO is full; 0: FIFO is not full. |
| 4 | CEC_RX_EMP | R/O | 0x1 | CEC Rx FIFO empty indicator. 1: FIFO is empty; 0: FIFO is not empty |
| 3:0 | RX_FIFO_CNT | R/O | 0x0 | The number of bytes in CEC Rx FIFO |

TABLE 9.3

CEC Tx Status Register, DisplayPort Address: 0x00572

| Bit(s) | Name | Type | Default | Description |
|---|---|---|---|---|
| 7 | CEC_TX_BUSY | R/O | 0x0 | CEC Tx busy. 1: receiver busy; 0: receiver idle |
| 6 | CEC_TX_FAIL | R/O | 0x0 | CEC Tx fail indicator for last sent message. 1: fail; 0: success. |
| 5 | CEC_TX_FUL | R/O | 0x0 | CEC Tx FIFO full indicator. 1: FIFO is full; 0: FIFO is not full. |
| 4 | CEC_TX_EMP | R/O | 0x1 | CEC Tx FIFO empty indicator. 1: FIFO is empty; 0: FIFO is not empty |
| 3:0 | TX_FIFO_CNT | R/O | 0x0 | The number of bytes in CEC Tx FIFO |

TABLE 9.4

CEC FIFO Register, DisplayPort Address: 0x00573

| Bit(s) | Name | Type | Default | Description |
|---|---|---|---|---|
| 7:0 | CEC_FIFO | R/W | 0x0 | CEC FIFO data port |

If a CEC Host wants to send a CEC command, the CEC Host may check a CEC status at first to identify whether the CEC line is ready to send command. When the CEC line is ready, then the CEC Host may write the CEC command content to CEC_FIFO until CEC FIFO is full or the CEC command is completed. Then the CEC Host may set CEC_TX_ST to start CEC for sending the command. If the CEC Host detects the CEC FIFO is not full and there is still command content pending to send, the CEC Host may write a second command to CEC FIFO until FIFO is full or the second command is finished. After all commands are sent or the FIFO is full, the DP receiver vendor-specific interrupt at Bit 7 of DPCD 00510h may be set to indicate this event.

Figure 29:
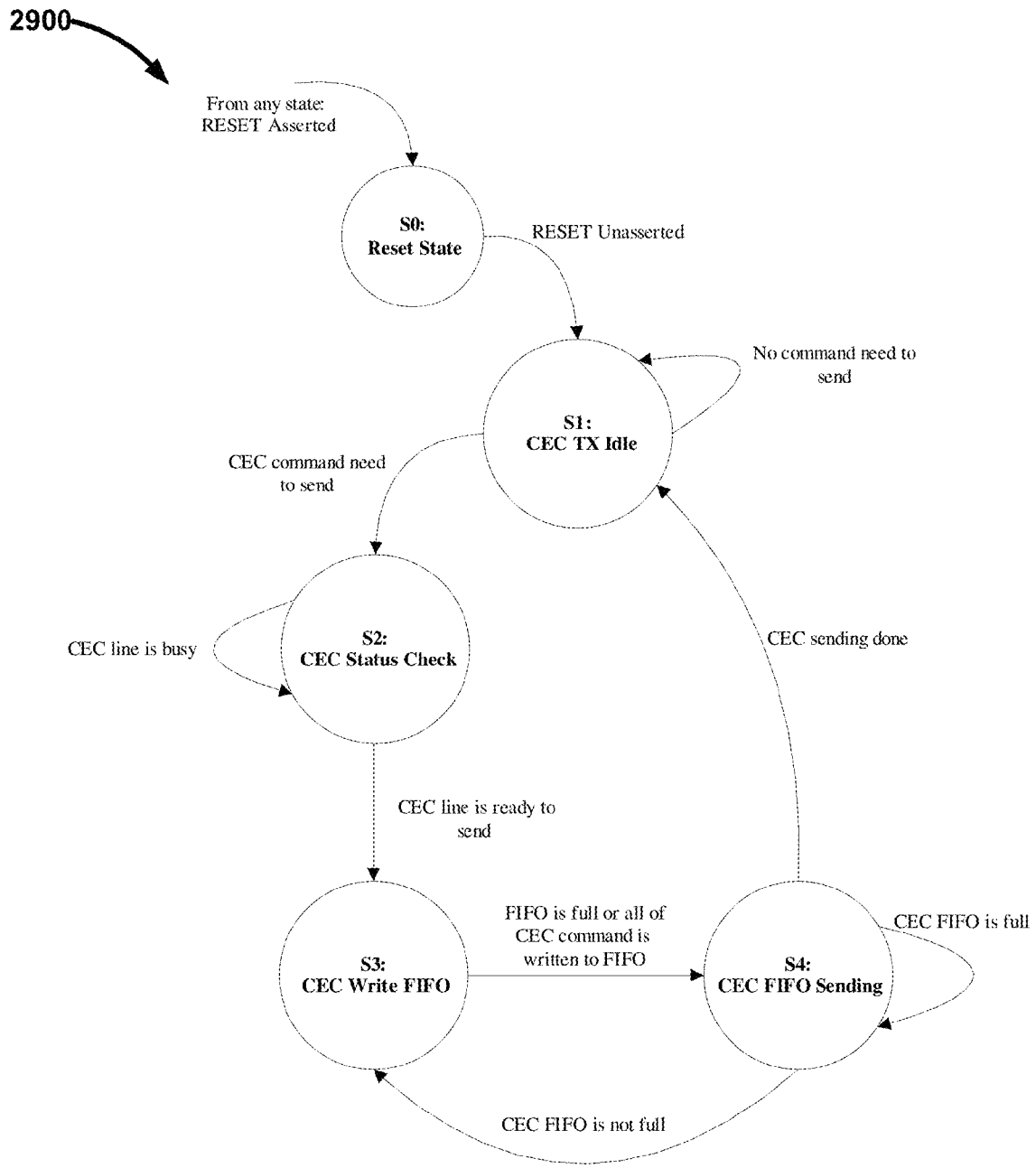
FIG. 29 is a state diagram of an exemplary interface assembly providing a Consumer Electronics Control (CEC) command.
Figure 30:
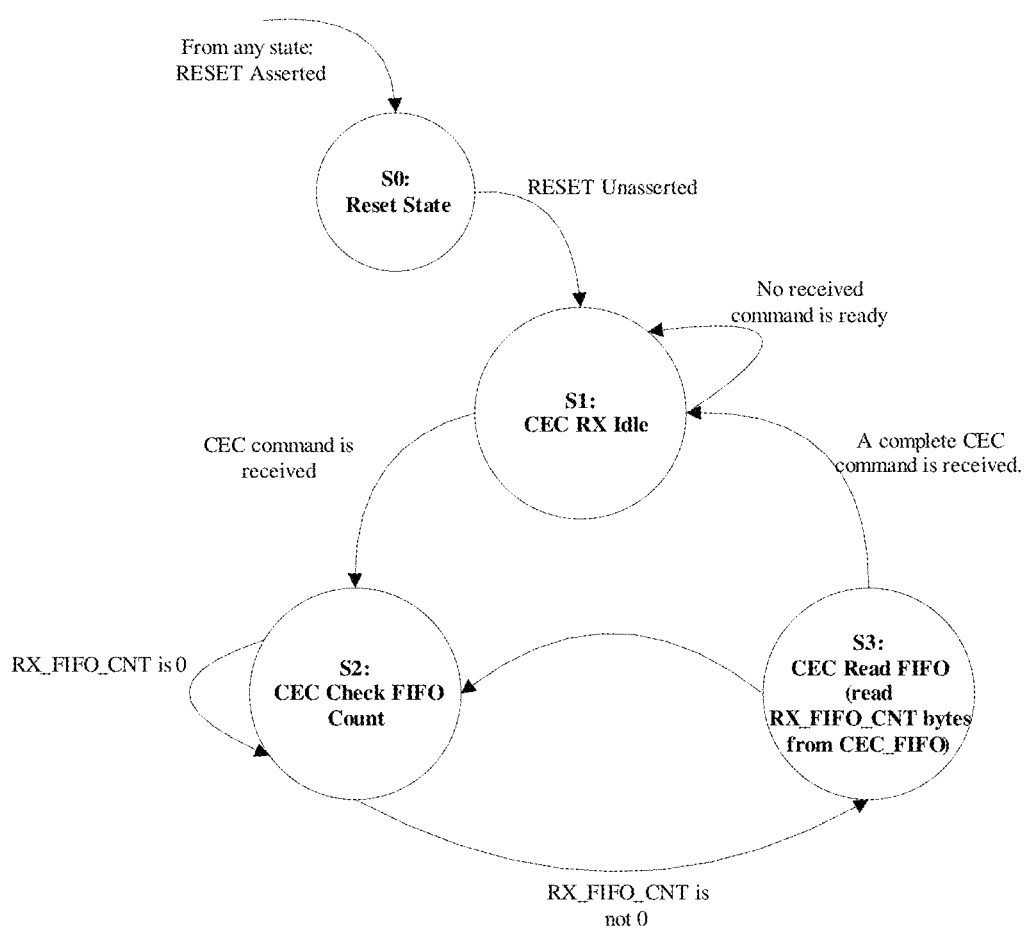
FIG. 30 is a state diagram of an exemplary interface assembly receiving a CEC command.

If a CEC command is received by a CEC repeater/converter from, for example, an HDMI sink device, the CEC repeater/converter may notify the CEC Host with the DP receiver vendor-specific interrupt. The CEC Host may read the CEC command from CEC FIFO. FIGS. 29 and 30 illustrate exemplary CEC sending flow and CEC receiving flow charts respectively. Table 10 illustrates exemplary vendor-specific interrupts.

TABLE 10

Vendor Specific Interrupt List

| DPCD Address | Definition | Read/Write |
|---|---|---|
| 00510h | VENDOR_SPECIFIC_INTERRUPT<br>Bit 0 = Downstream HPD is changed from 0 to 1.<br>Bit 1 = Downstream HPD is changed from 1 to 0.<br>Bit 2 = Link is down.<br>Bit 3 = Downstream HDCP is done.<br>Bit 4 = Downstream HDCP is fail.<br>Bit 5 = Downstream HDCP link integrity check fail.<br>Bit 6 = Received CEC command ready.<br>Bit 7 = CEC command transfer done. | Write clear (Write 1 to each to clear the corresponding interrupt.) |
| 00511h | VENDOR_SPECIFIC_INTERRUPT<br>Bit 0 = CEC TX Error.<br>Bit 1 = CEC TX No ACK.<br>Bit 2 = Downstream HDMI sink termination resistor is detected.<br>Bit 3 = Downstream 2.1 V power is ready.<br>Bit 4 = Downstream 5 V power is ready.<br>Bit 5 = Downstream power status change.<br>Other bit is reserved. | Write clear (Write 1 to clear the corresponding interrupt.) |

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

The invention claimed is:

1. A method of transferring data between a universal serial bus (USB) port of a first device and a media port of a second device, the media port being compatible with a first media standard, the method comprising:
   receiving, at a USB connector, uncompressed high definition media data from the USB port of the first device, the uncompressed high definition media data comprising side-band communication data, the side-band communication data being received at the USB connector as a single signal;
   causing the received uncompressed high definition media data to be supplied to a media connector in accordance with the first media standard, such that the supplied uncompressed high definition media data in accordance with the first media standard can be transmitted in accordance with the first media standard via the media connector to the media port of the second device; and
   converting the side-band communication data received in the single signal at the USB connector into a plurality of signals in accordance with the first media standard, such that the side-band communication data can be communicated to the second device in accordance with the first media standard, the first media standard being DisplayPort, High Definition Multimedia Interface (HDMI), or Digital Video Interactive (DVI).

2. The method of claim 1, further comprising detecting that the USB port of the first device is coupled to the USB connector and that the media port of the second device is coupled to the media connector.

3. The method of claim 1, wherein the received uncompressed high definition media data comprises at least one lane of data in accordance with the DisplayPort standard.

4. The method of claim 3, wherein if the first media standard is the DisplayPort standard, the at least one lane of data in accordance with the DisplayPort standard is supplied to the media connector; and
   wherein if the first media standard is other than the DisplayPort standard, the at least one lane of data in accordance with the DisplayPort standard is configured in accordance with the first media standard and then supplied to the media connector.

5. The method of claim 1, further comprising:
   receiving data at the media connector from the second device; and
   configuring the data received from the second device for supplying to the USB connector for communicating to the USB port of the first device; the configuring including converting the received data into a single signal, such that the data received from the second device can be communicated to the USB port of the first device via the USB connector in accordance with a first protocol.

6. The method of claim 1, wherein the first media standard is predetermined based on a media connector type.

7. The method of claim 1, further comprising supplying an indication of a device type to the first device, the indication being indicative of a media mode.

8. A system for transferring data between a first device and a second device, the system comprising:
   a universal serial bus (USB) connector having a first plurality of pins;
   a media connector having a second plurality of pins;
   an electrical cable coupling the USB connector to the media connector, the electrical cable including a plurality of conductors; and
   a circuit coupled to at least some of the plurality of conductors of the electrical cable at points between ends of the first plurality of pins of the USB connector and ends of the second plurality of pins of the media connector, the circuit comprising a controller, the controller being a semiconductor device, the circuit for causing uncompressed high definition media data received at the USB connector from the first device to be supplied in accordance with a first media standard to the media connector, such that the supplied media data can be transmitted via the media connector to the second device, the uncompressed high definition media data received at the USB connector comprising:

side-band communication data received at the USB connector as a single signal, the single signal being coupled to the controller by one of the plurality of conductors of the electrical cable, the controller being further operable to convert the side-band communication data received in the single signal into a plurality of signals in accordance with the first media standard, the plurality of signals being supplied to the media connector via the electrical cable, such that the side-band communication data can be communicated to the second device in accordance with the first media standard, the first media standard being DisplayPort, High Definition Multimedia Interface (HDMI), or Digital Video Interactive (DVI).

9. The system of claim 8, further comprising a device type indicator coupled between the circuit and the USB connector, the device type indicator to supply an indication of a media mode to the USB connector.

10. The system of claim 9, wherein the device type indicator comprises an impedance coupled between one of the plurality of conductors of the electrical cable and a reference potential, such that a voltage state indicative of the media mode is detectable at a respective one of the plurality of pins of the USB connector when a current is provided to the respective pin.

11. The system of claim 8, wherein the controller is operable to detect that the first device is coupled to the USB connector and that the second device is coupled to the media connector.

12. The system of claim 8, wherein if the first media standard is the DisplayPort standard, the controller is operable to supply at least one lane of data in accordance with the DisplayPort standard to the media connector;
wherein if the first media standard is other than the DisplayPort standard, the at least one lane of data in accordance with the DisplayPort standard is configured by the controller in accordance with the first media standard and then supplied to the media connector; and
wherein the controller is operable to receive data via the media connector from the second device and to configure the data received from the second device to supply to the USB connector, the configuring the data received from the second device including converting the received data into a single signal coupled to the USB connector, such that the data received from the second device can be communicated to the USB port of the first device via the USB connector in accordance with a first protocol.

13. The system of claim 12, wherein the first device is configured to process the data in accordance with the first protocol.

14. The system of claim 8, wherein the second device is configured for processing the uncompressed high definition media data supplied in accordance with a first media standard for presenting to a user.

15. The system of claim 8, wherein the first media standard is predetermined based on a media connector type.

* * * * *